United States Patent
Park et al.

(10) Patent No.: US 12,199,718 B2
(45) Date of Patent: Jan. 14, 2025

(54) METHOD AND APPARATUS FOR REPORTING CHANNEL STATE INFORMATION FOR NETWORK COOPERATIVE COMMUNICATION

(71) Applicant: Samsung Electronics Co., Ltd., Suwon-si (KR)

(72) Inventors: Jinhyun Park, Suwon-si (KR); Hoondong Noh, Suwon-si (KR); Youngwoo Kwak, Suwon-si (KR); Heecheol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 17/298,322

(22) PCT Filed: Dec. 2, 2019

(86) PCT No.: PCT/KR2019/016830
§ 371 (c)(1),
(2) Date: May 28, 2021

(87) PCT Pub. No.: WO2020/116874
PCT Pub. Date: Jun. 11, 2020

(65) Prior Publication Data
US 2022/0029682 A1 Jan. 27, 2022

(30) Foreign Application Priority Data
Dec. 3, 2018 (KR) .......................... 10-2018-0153693

(51) Int. Cl.
*H04B 7/06* (2006.01)
*H04B 7/024* (2017.01)
(Continued)

(52) U.S. Cl.
CPC ........... *H04B 7/0626* (2013.01); *H04B 7/024* (2013.01); *H04B 7/0456* (2013.01); *H04B 17/24* (2015.01); *H04L 5/0048* (2013.01); *H04L 5/0057* (2013.01)

(58) Field of Classification Search
None
See application file for complete search history.

(56) References Cited

U.S. PATENT DOCUMENTS 8,917,618 B2 12/2014 Chatterjee et al.
2015/0023194 A1 1/2015 Seo et al.
(Continued)

FOREIGN PATENT DOCUMENTS

KR 10-2014-0115333 A 9/2014
KR 10-2014-0121391 A 10/2014
(Continued)

OTHER PUBLICATIONS

Huawei et al., 'CSI enhancements for non-coherent JT', R1-1611178, 3GPP TSG RAN WG1 Meeting #87, Reno, USA, Nov. 5, 2016.
(Continued)

*Primary Examiner* — Jay L Vogel
(74) *Attorney, Agent, or Firm* — Jefferson IP Law, LLP

(57) ABSTRACT

A communication technique for merging, with IoT technology, a 5G communication system or supporting a data transmission rate higher than that of a 4G system; and a system therefor is provided. The disclosure can be applied to intelligent services (for example, smart home, smart building, smart city, smart car or connected car, healthcare, digital education, retail, security, and safety-related services, and the like) on the basis of 5G communication technology and IoT-related technology. A method and an apparatus for reporting channel state information for network cooperative communication are disclosed.

20 Claims, 12 Drawing Sheets

(51) Int. Cl.
*H04B 7/0456* (2017.01)
*H04B 17/24* (2015.01)
*H04L 5/00* (2006.01)

(56) References Cited

U.S. PATENT DOCUMENTS

| | | | |
|---|---|---|---|
| 2016/0006487 A1 | 1/2016 | Ding et al. | |
| 2017/0244533 A1* | 8/2017 | Onggosanusi | H04B 7/0478 |
| 2018/0042028 A1* | 2/2018 | Nam | H04L 5/0035 |
| 2019/0124534 A1* | 4/2019 | Yum | H04B 7/063 |
| 2020/0036555 A1* | 1/2020 | Davydov | H04L 25/0224 |
| 2021/0306045 A1* | 9/2021 | Cha | H04B 17/345 |
| 2022/0006581 A1* | 1/2022 | Yamada | H04W 72/1273 |

FOREIGN PATENT DOCUMENTS

| | | | | |
|---|---|---|---|---|
| KR | 10-2018-0107048 A | 10/2018 | | |
| WO | WO-2012015737 A1 * | 2/2012 | | H04B 7/06 |
| WO | WO-2018229078 A1 * | 12/2018 | | H04B 7/0417 |
| WO | WO-2019065189 A1 * | 4/2019 | | H04B 17/309 |
| WO | WO-2019065191 A1 * | 4/2019 | | H04B 7/0413 |

OTHER PUBLICATIONS

ZTE Corporation et al., 'Potential enhancements for non-coherent JT', R1-1608692, 3GPP TSG RAN WG1 Meeting #86bis, Lisbon, Portugal, Oct. 1, 2016.

Huawei et al., 'CSI measurement and reporting for non-coherent JT', R1-1712095, 3GPP TSG RAN WG1 Meeting #90, Prague, Czech Republic, Aug. 12, 2017.

3rd Generation Partnership Project; Technical Specification Group Radio Access Network; NR; Physical layer procedures for data (Release 15), 3GPP TS 38.214 V15.3.0 (Sep. 2018), 3GPP server publication date Oct. 1, 2018.

Korean Office Action dated Oct. 17, 2023, issued in Korean Patent Application No. 10-2018-0153693.

* cited by examiner

SITUATION 1. $r_1 + r_2 \leq n$ and $r_1 \approx r_2$ (9-01)

SITUATION 2. $r_1 \gg r_2$ (9-20)

METHOD AND APPARATUS FOR REPORTING CHANNEL STATE INFORMATION FOR NETWORK COOPERATIVE COMMUNICATION

TECHNICAL FIELD

The disclosure relates to a wireless communication system and, more particularly, to a method for a terminal to report base station-terminal channel state information in order to smoothly provide a service, and an apparatus therefor.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been considered.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Recently, research on cooperative network communication has been actively conducted, and accordingly there are an increasing number of demands for efficient reporting of channel state information in a cooperative network communication environment.

DISCLOSURE OF INVENTION

Technical Problem

The disclosure relates to a wireless communication system and, more particularly, to a method for a terminal to report information about the state of a channel from one or a plurality of base stations to the terminal for cooperative network communication, and an apparatus therefor.

Solution to Problem

To solve the above-mentioned problems, a method for a terminal according to an embodiment includes: receiving first information for generating CSI associated with a plurality of base stations and second information for reporting the CSI when non-coherent joint transmission (NC-JT) by the plurality of base stations is configured; receiving at least one reference signal from each of the plurality of base stations based on the first information; generating the CSI associated with to the plurality of base stations based on the at least one reference signal; and transmitting the CSI associated with the plurality of base stations based on the second information.

To solve the above-mentioned problems, a method for a base station according to an embodiment includes: transmitting first information for generating CSI associated with a plurality of base stations and second information for reporting the CSI to a terminal when non-coherent joint transmission (NC-JT) by the plurality of base stations is configured for the terminal; transmitting at least one reference signal to the terminal based on the first information; and receiving the CSI generated based on the at least one reference signal and associated with the plurality of base stations from the terminal based on the second information.

To solve the above-mentioned problems, a terminal according to an embodiment includes: a transceiver configured to transmit and receive a signal; and a controller configured to receive first information for generating CSI associated with a plurality of base stations and second information for reporting the CSI when non-coherent joint transmission (NC-JT) by the plurality of base stations is configured, to receive at least one reference signal from each of the plurality of base stations based on the first information, to generate the CSI associated with to the plurality of base stations based on the at least one reference signal, and to transmit the CSI associated with the plurality of base stations based on the second information.

To solve the above-mentioned problems, a method for a base station according to an embodiment includes: a transceiver configured to transmit and receive a signal; and a controller configured to transmit first information for generating CSI associated with a plurality of base stations and second information for reporting the CSI to a terminal when non-coherent joint transmission (NC-JT) by the plurality of base stations is configured for the terminal, to transmit at least one reference signal to the terminal based on the first information, and to receive the CSI generated based on the at least one reference signal and associated with the plurality of base stations from the terminal based on the second information.

Advantageous Effects of Invention

According to the disclosure, when cooperative network communication is used in a wireless communication system, a terminal can report channel state information using less payload. Accordingly, it is possible to efficiently manage a process of reporting channel state information between the terminal and a base station.

MODE FOR THE INVENTION

Figure 1:
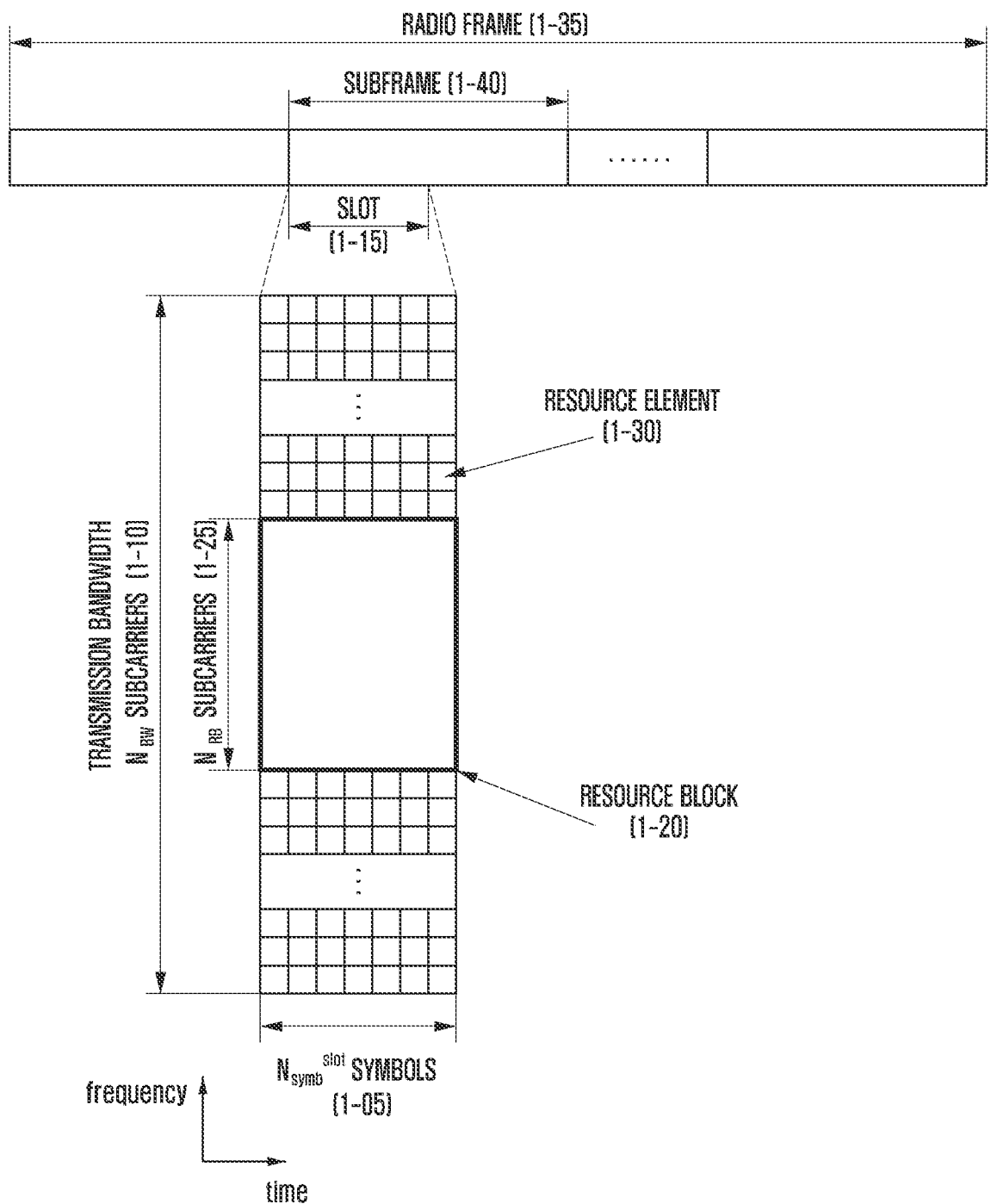
FIG. 1 illustrates a transmission structure in a time-frequency domain in long-term evolution (LTE), LTE-advanced (LTE-A), new radio (NR), or similar wireless communication systems.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here; it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms referring to broadcast information, terms referring to control information, terms related to communication coverage, terms referring to state changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

In the following description, the disclosure will be described using terms and names defined in the 3rd generation partnership project long term evolution (3GPP LTE) and 5G new radio (NR) standards for the convenience of description. However, the disclosure is not limited by these terms and names, and may be applied in the same way to systems that conform other standards.

A wireless communication system is evolving from initially providing voice-oriented services into a broadband wireless communication system for providing high-speed and high-quality packet data services according to a communication standard, for example, high speed packet access (HSPA), long-term evolution (LTE or evolved universal terrestrial radio access (E-UTRA)), LTE-advanced (LTE-A), or LTE-Pro of the 3GPP, high rate packet data (HRPD) or ultra-mobile broadband (UMB) of the 3GPP2, and IEEE 802.16e.

As a representative example of the broadband wireless communication system, an LTE system employs an orthogonal frequency division multiplexing (OFDM) scheme for a downlink (DL) and employs a single-carrier frequency division multiple access (SC-FDMA) scheme for an uplink (UL). The uplink refers to a radio link for a terminal to transmit data or a control signal to a base station, and the downlink refers to a radio link for the base station to transmit data or a control signal to the terminal. These multiple access schemes allocate and manage time-frequency-spatial resources for carrying data or control information per user not to overlap with each other, that is, to be orthogonal to each other, thereby dividing data or control information for each user.

A 5G communication system as a post-LTE communication system needs to be able to freely reflect various demands from users and service providers and is thus required to support services satisfying various requirements. Services considered for a 5G communication system include enhanced mobile broadband (eMBB), massive machine-type communication (mMTC), ultra-reliability and low-latency communications (URLLC), and the like.

According to some embodiments, eMBB is intended to provide a further enhanced data rate than that supported by existing LTE, LTE-A, or LTE-A Pro systems. For example, in a 5G communication system, for one base station, eMBB needs to be able to provide a peak data rate of 20 Gbps in a downlink and a peak data rate of 10 Gbps in an uplink. Further, the 5G communication system needs to provide an increased user-perceived data rate. In order to meet these requirements, improved transmission and reception technologies including an enhanced multiple-input and multiple-output (MIMO) transmission technology are required. In addition, the 5G communication system may employ a frequency bandwidth wider than 20 MHz in a frequency band ranging from 3 to 6 GHz or a 6-GHz frequency band or higher instead of a 2-GHz band used by a current LTE system, making it possible to satisfy a data rate required for the 5G communication system.

In the 5G communication system, mMTC is taken into consideration to support application services, such as the IoT. To efficiently provide the IoT, mMTC requires support for access of a great number of terminals in a cell, enhanced terminal coverage, increased battery time, reduced terminal cost, and the like. The IoT is attached to various sensors and various devices to provide a communication function and thus needs to be able to support a large number of terminals (e.g., 1,000,000 terminals/km$^2$) in a cell. A terminal supporting mMTC is highly likely to be located in a shadow area not covered by a cell, such as the basement of a building, due to the nature of services and may thus require wider coverage than for other services provided by the 5G communication system. A terminal supporting mMTC needs to be configured as a low-cost terminal, and may require a very long battery life time because it is difficult to frequently change the battery of the terminal.

Finally, URLLC is a mission-critical cellular-based wireless communication service and is used for remote control of robots or machinery, industrial automation, unmanned aerial vehicles, remote health care, emergency alerts, and the like. Therefore, URLLC needs to provide ultralow-latency and ultrahigh-reliability communication. For example, a URLLC-supporting service is required not only to satisfy an air interface latency of less than 0.5 milliseconds (ms) but also to have a packet error rate of $10^{-5}$ or less. Therefore, for the URLLC-supporting service, a 5G system needs to provide a shorter transmission time interval (TTI) than that of other services and also requires a design for allocating a wide resource in a frequency band. The foregoing mMTC, URLLC, and eMBB are merely illustrative examples of different service types, and service types to which the disclosure is applied is not limited to the foregoing examples.

Services considered in the foregoing 5G communication system may be provided by fusion with each other based on one framework. That is, for efficient resource management and control, the individual services may be integrated into one system, thus being controlled and transmitted.

Hereinafter, a frame structure in LTE, LTE-A, LTE-A Pro, and 5G NR systems will be described in detail with reference to a drawing.

FIG. 1 illustrates the basic structure of a time-frequency resource region, which is a radio resource region in which a data or control channel of the LTE, LTE-A, LTE-A Pro, and 5G NR systems based on a cyclic prefix (CP) OFDM (CP-OFDM) or SC FDMA waveform is transmitted. In FIG. 1, a horizontal axis denotes a time domain, and a vertical axis denotes a frequency domain.

A minimum transmission unit in the time domain in the LTE, LTE-A, LTE-A Pro, and 5G NR systems is an OFDM symbol or SC-FDMA symbol, and $N_{symb}^{slot}$ 1-05 symbols form one slot 1-15.

In LTE, LTE-A, and LTE-A Pro, two slots including $N_{symb}$=7 symbols may form one subframe 1-40.

According to an embodiment of the disclosure, $N_{symb}^{slot}$ may be determined according to the length of a cyclic prefix (CP) added to each symbol to prevent interference between symbols. For example, in 5G NR, when a normal CP is applied, $N_{symb}$=14, and when an extended CP is applied, $N_{symb}$=12. The extended CP may be applied to a system having a relatively longer radio wave transmission distance than that to which the general CP is applied to maintain orthogonality between symbols.

According to an embodiment of the disclosure, 5G NR may support two types of slot structures, which as a slot and a mini-slot. Here, the mini-slot may be referred to as a non-slot.

In LTE and LTE-A, the length of a slot may be 0.5 ms, and the length of a subframe may be 1.0 ms. In the 5G NR system, the length of a slot or mini-slot may be flexibly changed according to subcarrier spacing. In LTE, LTE-A, and LTE-A Pro, a minimum transmission unit in the frequency domain is a subcarrier in 15 kHz (subcarrier spacing=15 kHz), and the bandwidth of an entire system transmission bandwidth includes a total of $N_{BW}$ subcarriers 1-10. The flexible and extendable frame structure of the 5G NR system will be described below.

In the time-frequency domain, a basic unit of a resource is a resource element (RE) 1-30 and may be represented by an OFDM symbol or SC-FDMA symbol index and a subcarrier index. A resource block (or physical resource block: PRB) 1-20 may be defined by $N_{symb}^{slot}$ consecutive OFDM symbols or SC-FDMA symbols 1-05 in the time domain and NBR consecutive subcarriers 1-25 in the frequency domain. Therefore, one RB 1-20 includes $N_{symb}*N_{RB}$ REs 1-30. Data is mapped in RBs, and a base station performs scheduling in RBs for a predetermined terminal.

According to an embodiment of the disclosure, subcarrier spacing, CP length, and the like are information necessary for OFDM transmission and reception and may be values commonly recognized by a base station and a terminal.

The frame structure of the LTE and LTE-A systems are designed in consideration of general voice/data communication and may be too restricted in scalability to satisfy various services and user requirements as in the 5G NR system. Accordingly, in the 5G NR system according to an embodiment of the disclosure, a flexible frame structure may be defined, thereby satisfying various services and user requirements.

Figure 2:
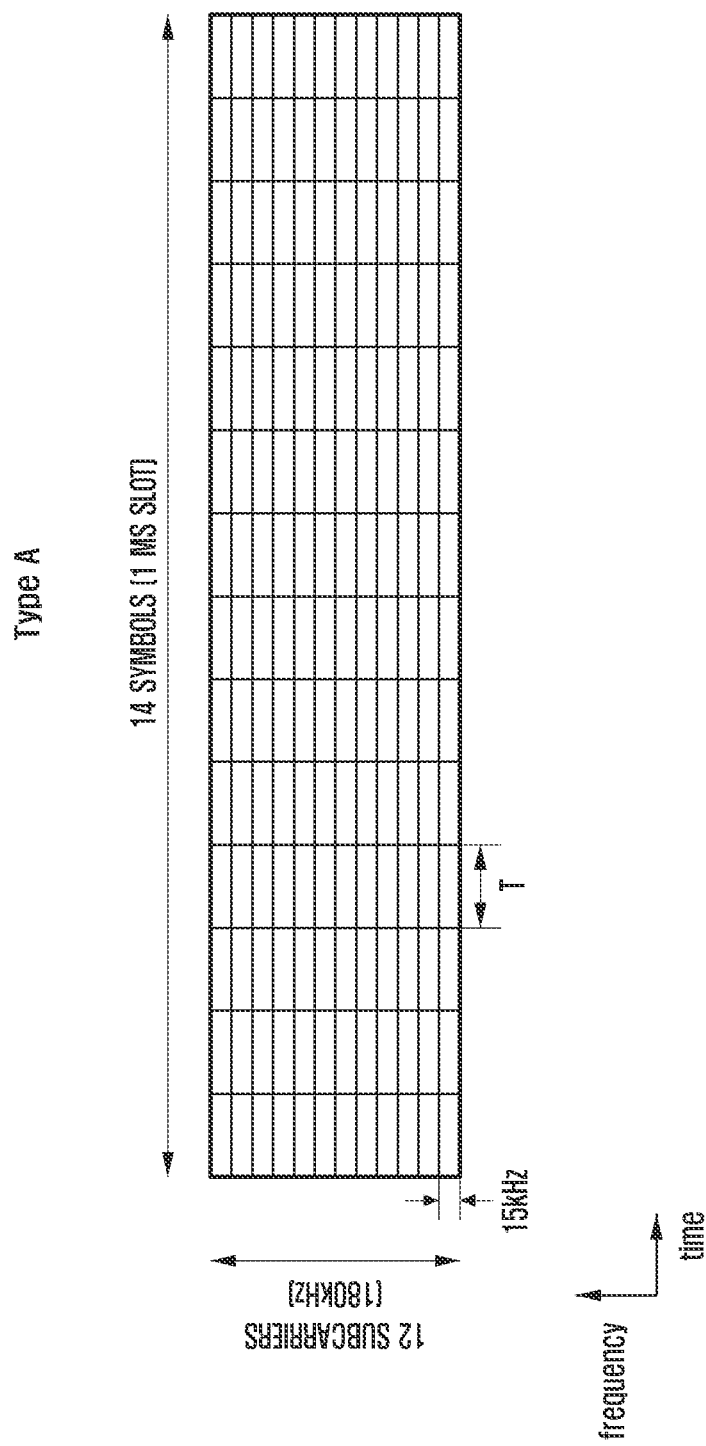
FIG. 2 illustrates an extended frame structure according to an embodiment of the disclosure.
Figure 3:
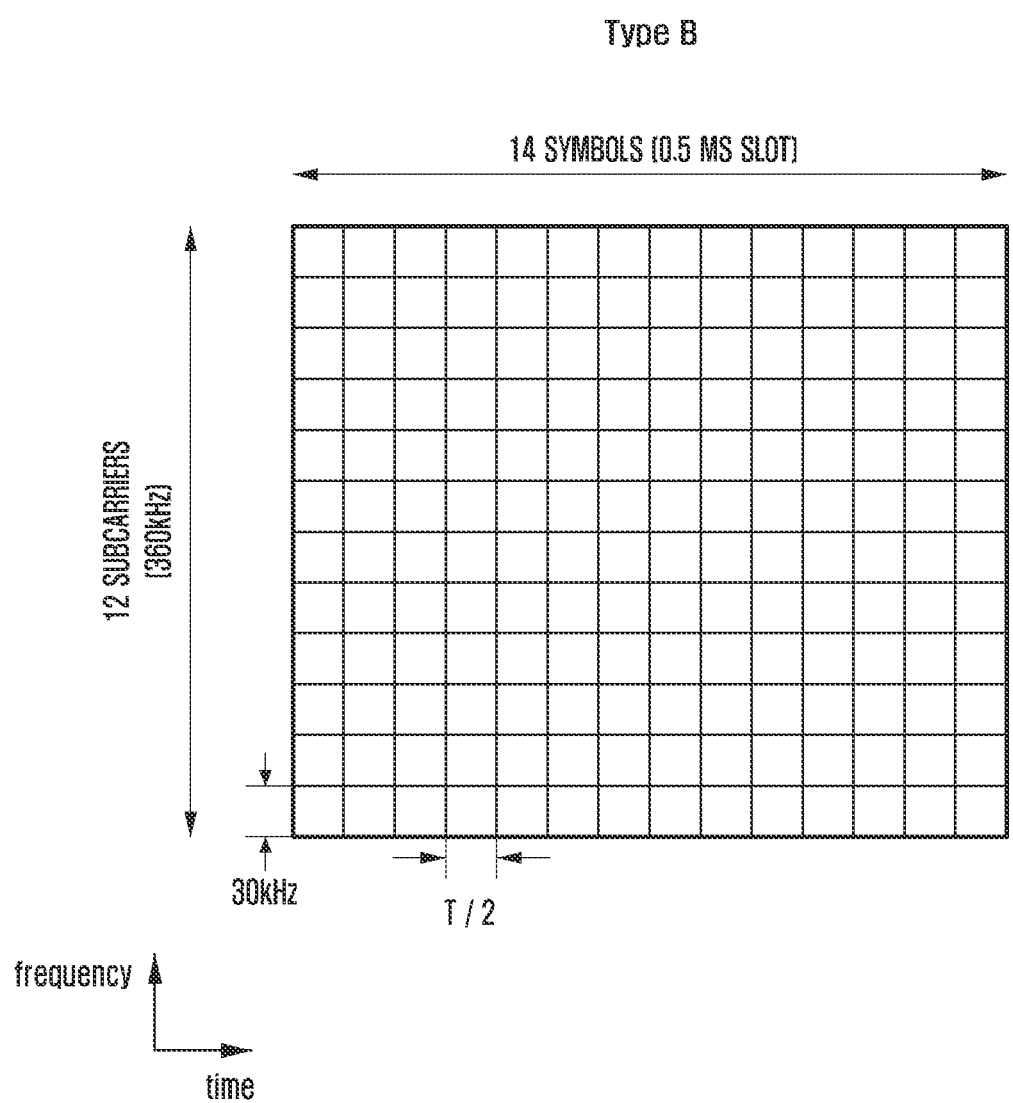
FIG. 3 illustrates an extended frame structure according to an embodiment of the disclosure.
Figure 4:
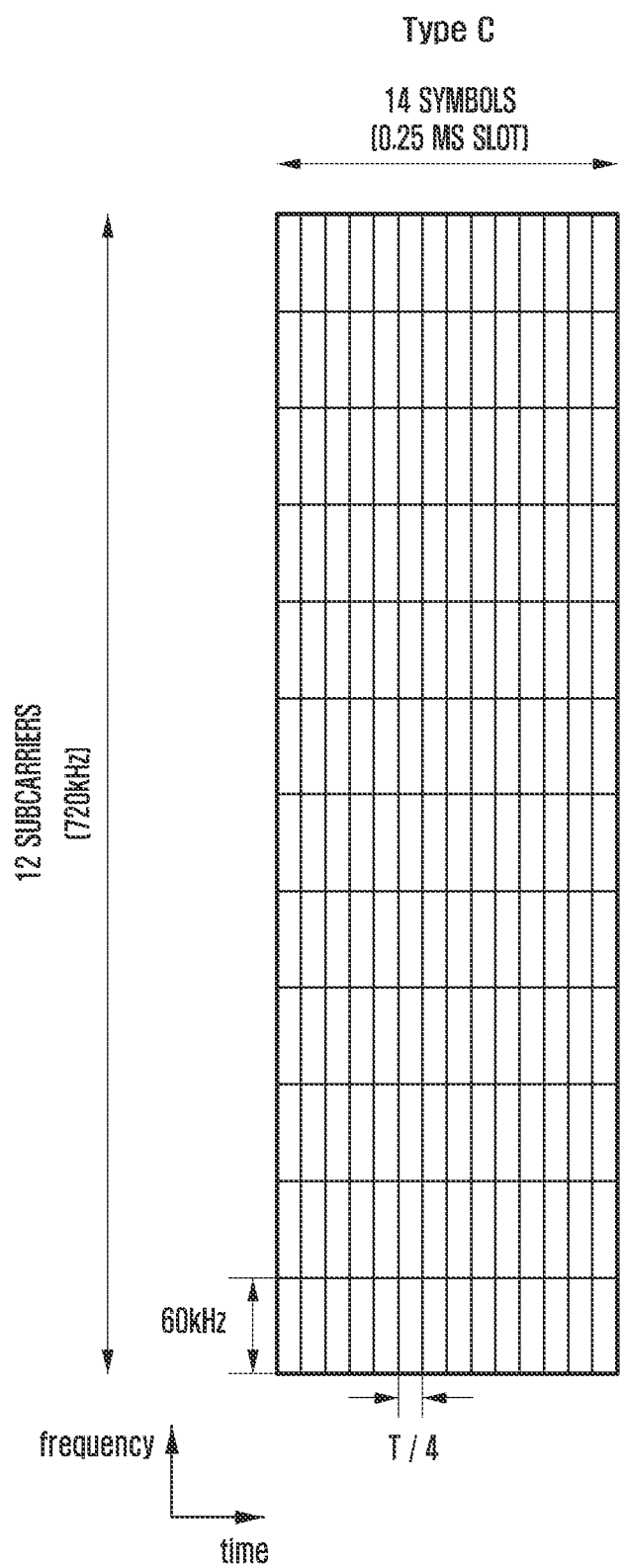
FIG. 4 illustrates an extended frame structure according to an embodiment of the disclosure.

FIG. 2, FIG. 3, and FIG. 4 illustrate extended frame structures according to some embodiments.

According to an embodiment of the disclosure, an essential parameter set for defining an extended frame structure may include subcarrier spacing, CP length, slot length, and the like. In the 5G NR system, a basic time unit for performing scheduling may be a slot.

The 5G NR system may operate independently or may coexist with the LTE/LTE-A/LTE-A Pro system to operate in a dual mode. Accordingly, existing LTE/LTE-A/LTE-A Pro may provide a stable system operation, and the 5G NR system may provide an improved service. Accordingly, an extended frame structure of the 5G system may include an LTE/LTE-A/LTE-A Pro frame structure or an essential parameter set.

According to an embodiment of the disclosure, FIG. 2 illustrates a 5G NR frame structure, which is the same as an LTE/LTE-A/LTE-A Pro frame structure, or an essential parameter set. In frame structure type A illustrated in FIG. 2, subcarrier spacing is 15 kHz, 14 symbols form a slot of 1 ms, and 12 subcarriers (=180 kHz=12×15 kHz) form a physical resource block (PRB).

According to an embodiment of the disclosure, in frame structure type B illustrated in FIG. 3, subcarrier spacing is 30 kHz, 14 symbols form a slog of 0.5 ms, and 12 subcarriers (=360 kHz=12×30 kHz) form a PRB. That is, compared to frame structure type A, the subcarrier spacing and the size of the PRB are increased by two times, and the length of a slot and the length of a symbol are reduced by two times.

According to an embodiment of the disclosure, in frame structure type C illustrated in FIG. 4, subcarrier spacing is 60 kHz, 14 symbols form a subframe of 0.25 ms, and 12 subcarriers (=720 kHz=12×60 kHz) form a PRB. That is, compared to frame structure type A, the subcarrier spacing and the size of the PRB size are increased by four times, and the length of a slot and the length of a symbol are decreased by four times.

That is, the frame structure types may be generalized such that subcarrier spacing, CP length, slot length, and the like of an essential parameter set in one frame structure type may be integer times those in another frame structure type, thereby providing high scalability.

In addition, a subframe having a fixed length of 1 ms may be defined to indicate a reference time unit irrelevant to the foregoing frame structure types. Therefore, one subframe may include one slot in frame structure type A, one subframe may include two slots in frame structure type B, and one subframe may include four slots in frame structure type C. An expendable frame structure is not limited to frame structure type A, B, or C described above, and it is apparent that different subcarrier spacing, such as 120 kHz or 240 kHz, may be applied and different structures may be employed.

According to an embodiment of the disclosure, the foregoing frame structure types may be applied to various scenarios.

In terms of cell size, since a longer CP length can support a larger the cell, frame structure type A may support a relatively larger cell than frame structure types B and C.

In terms of an operating frequency band, since larger subcarrier spacing is favorable to recover phase noise in a high frequency band, frame structure type C may support a relatively high operating frequency compared to frame structure types A and B.

In terms of a service, since a shorter subframe length is favorable to support an ultra-reliability and low-latency service, such as ultra-reliability and low-latency communications (URLLC), frame structure type C is relatively suitable for a URLLC service compared to frame structure types A and B.

According to an embodiment of the disclosure, a plurality of frame structure types may be multiplexed in one system and may be operated in an integrated manner.

According to an embodiment of the disclosure, the base station may schedule a physical downlink shared channel (PDSCH) for the terminal in view of channel state information and the size of data to be transmitted to the terminal and may then report scheduling information to the terminal through downlink control information (DCI). The reported DCI may include the number of layers of the scheduled downlink data and the position thereof on a frequency-time axis.

Hereinafter, DCI reported when a base station schedules downlink data for a terminal in a 5G NR system will be described in detail.

In an NR system, scheduling information about a PDSCH may be transmitted from a base station to a terminal through DCI. The terminal may monitor fallback and non-fallback DCI formats for a physical uplink shared channel (PUSCH) or the PDSCH. The fallback DCI format may include a fixed field predefined between the base station and the terminal. The non-fallback DCI format may include a configurable field.

The DCI may be transmitted through a physical downlink control channel (PDCCH) via channel coding and modulation. A cyclic redundancy check (CRC) may be attached to the payload of a DCI message.

The CRC may be scrambled with a radio network temporary identifier (RNTI) corresponding to the identity of the terminal. Different RNTIs may be used depending on the purpose of the DCI message, for example, terminal-specific (UE-specific) data transmission, a power control command, or a random access response. That is, the RNTI may be transmitted as being included in a CRC calculation process, rather than being explicitly transmitted. When the terminal receives the DCI message transmitted on the PDCCH, the terminal may identify the CRC using the allocated RNTI. When the identified CRC is correct, the terminal may recognize that the message is transmitted to the terminal.

According to an embodiment of the disclosure, DCI for scheduling a PDSCH for system information (SI) may be scrambled with an SI-RNTI. DCI for scheduling a PDSCH for a random access response (RAR) message may be scrambled with an RA-RNTI. DCI for scheduling a PDSCH for a paging message may be scrambled with a P-RNTI. DCI for reporting a slot format indicator (SFI) may be scrambled with an SFI-RNTI. DCI for reporting transmit power control (TPC) may be scrambled with a TPC-RNTI. DCI for scheduling a UE-specific PDSCH or PUSCH may be scrambled with a cell RNTI (C-RNTI).

DCI format 1_0 may be used as fallback DCI for scheduling a PDSCH, in which a CRC may be scrambled with a C-RNTI. DCI format 1_0 in which the CRC is scrambled with the C-RNTI may include, for example, the following information.

TABLE 1

Identifier for DCI formats - 1 bit
Frequency domain resource assignment
Time domain resource assignment - 4 bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - 2 bits TABLE 1-continued PUCCH resource indicator - 3 bits
PDSCH-to-HARQ_feedback timing indicator - 3 bits DCI format 1_1 may be used as non-fallback DCI for scheduling a PDSCH, in which a CRC may be scrambled with a C-RNTI. DCI format 1_1 in which the CRC is scrambled with the C-RNTI may include, for example, the following information.

TABLE 2

Identifier for DCI formats - 1 bit
Carrier indicator - 0 or 3 bits
Bandwidth part indicator - 0, 1, or 2 bits
Frequency domain resource assignment
Time domain resource assignment - 0, 1, 2, 3, or 4 bits
VRB-to-PRB mapping - 0 or 1 bit
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0, 2, or 4 bits
TPC command for scheduled PUCCH - 2 bits
PUCCH resource indicator - 3 bits
PDSCH-to-HARQ feedback timing indicator - 0, 1, 2, 3 bits
Antenna ports - 4, 5, or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit The bandwidth part indicator in Table 2 is an indicator indicating a bandwidth part (BWP) to which scheduled data belongs, and when the terminal does not support changing a bandwidth part to DCI, the indicator may be ignored. The number of bits for the indicator and mapping of a bandwidth part corresponding to the value of the indicator value may be configured through higher-layer signaling, that is, radio resource control (RRC) signaling.

Next, a process of measuring and reporting base station-terminal channel state information in a 5G NR system will be described in detail.

Figure 5:
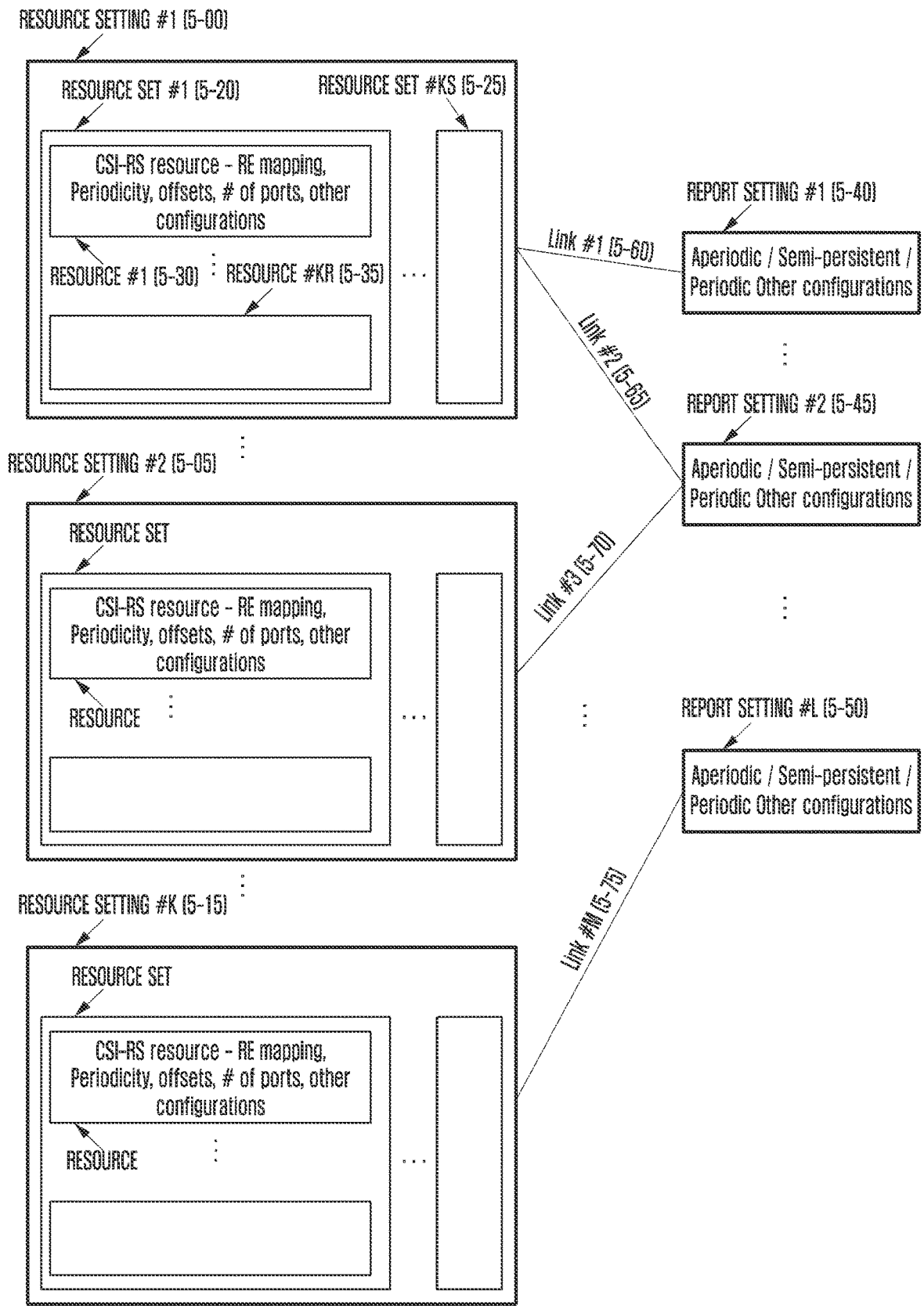
FIG. 5 illustrates a channel state information framework according to an embodiment of the disclosure.

FIG. 5 illustrates a channel state information framework of a 5G NR system according to some embodiments. The NR channel state information (CSI) framework illustrated FIG. 5 may include two elements, which are a resource setting and a report setting. The report setting may establish at least one link to the resource setting with reference to the ID of the resource setting.

According to an embodiment of the disclosure, the resource setting may include information related to a reference signal (RS). A base station may configure at least one resource setting 5-00, 5-05, or 5-15 for a terminal. Each resource setting may include at least one resource set 5-20 or 5-25. Each resource set may include at least one resource 5-30 or 5-35. Each resource 5-30 or 5-35 may include detailed information about an RS, for example, location information about a resource element (RE) through which the RS is transmitted, the transmission periodicity and time-axis offset of the RS, the number of RS ports, and the like.

According to an embodiment of the disclosure, the report setting may include information related to a CSI reporting method. The base station may configure at least one report setting 5-40, 5-45, or 5-50 for the terminal. Each report setting may include report transmission characteristic information, such as aperiodic, semi-persistent, periodic, the type of a channel through which a report is transmitted (e.g., a PUSCH or a physical uplink control channel (PUCCH)), the type of channel state information to be reported (e.g., a CSI-RS resource index (CSI-RS resource indicator (CRI)), the number of ranks (rank indicator (RI)), an optimal layer index (layer indicator (LI)), a precoding matrix indicator (PMI), or a channel quality indicator (CQI)), codebook information for precoding at the base station, and the like. In addition, each report setting may include a frequency band for reporting channel state information and may include whether to use a wideband PMI/CQI for reporting one PMI or CQI for the entire frequency band or whether to divide the frequency band into a plurality of subbands and to use a subband PMI/CQI for reporting one PMI or CQI for each subband. Here, the report setting may include at least one ID for referring to information about a reference signal (or RE location) for channel or interference measurement for reference by the terminal in CSI reporting, which is schematically illustrated through links 5-60, 5-65, 5-70, and 5-75.

According to an embodiment of the disclosure, when a link 5-60 connects one reporting setting 5-40 and one resource setting 5-00, the resource setting 5-00 may be used for channel measurement.

According to an embodiment of the disclosure, when a link 5-65 or 5-70 connects one reporting setting 5-45 and two resource settings 5-00 and 5-05, one of the two resource settings of may be used for channel measurement, and the other resource setting may be used for interference measurement.

According to an embodiment of the disclosure, each resource setting may include resource transmission characteristic information, such as aperiodic, semi-permanent, and periodic, and may include transmission band information, such as a BWP through which a resource is transmitted.

According to an embodiment of the disclosure, each resource set in a resource setting may configure information including at least one of the following listed values through a higher layer. However, the disclosure is not necessarily limited to the following examples.

Repetition: Information about a spatial domain transmission filter for resources in the resource set trs-Info: Information about whether resources in the resource set are used as a tracking RS (TRS) for time/frequency tracking When Repetition is 'ON', the terminal may know that the same spatial domain transmission filter is applied to all of the resources belonging to the resource set. That is, the terminal may assume that the base station has used the same transmission beam. In addition, the terminal may know that each resource has the same number of ports and the same periodicity.

When Repetition is 'OFF', the terminal may not assume that the same spatial domain transmission filter is applied to all non-zero power (NZP) CSI-RS resources belonging to the resource set. That is, the terminal may not assume that the base station has used the same transmission beam. The terminal may not know that each resource has the same number of ports and the same periodicity.

An NZP CSI-RS may be one most representative reference signal configured in a resource set. The resource set may configure information including at least one of the following listed values for each CSI-RS through a higher layer. However, the disclosure is not necessarily limited to the following examples.

periodicityAndOffset: Transmission periodicity and slot offset of a corresponding CSI-RS resource CSI-RS-resourceMapping: OFDM symbol location of the CSI-RS resource in a slot and subcarrier location of the CSI-RS resource in a PRB nrofPorts: Number of CSI-RS ports included in the CSI-RS resource Density: Frequency density of the CSI-RS cdm-Type: Code division multiplexing (CDM) length and CDM RE pattern of the CSI-RS.

powerControlOffset: Ratio between PDSCH energy per RE (EPRE) and NZP CSI-RS EPRE powerControlOffsetSS: Ratio between synchronization signal/physical broadcast channel (SS/PBCH) block EPRE and NZP CSI-RS EPRE According to an embodiment of the disclosure, in 5G NR, one CSI-RS port number among 1, 2, 4, 8, 12, 16, 24, and 32 may be set for one CSI-RS resource. Different degrees of configuration freedom may be supported depending on the number of CSI-RS ports set for the CSI-RS resource.

Table 3 shows CSI-RS density, CDM length and type, the frequency-axis and time-axis start locations ($\bar{k}$, $\bar{l}$) of a CSI-RS component RE pattern, and the frequency-axis RE number (k') and time-axis RE number (l') of the CSI-RS component RE pattern that can be set according to the number (X) of NR CSI-RS ports.

According to an embodiment of the disclosure, a CSI-RS component RE pattern may be a basic unit forming a CSI-RS resource. The CSI-RS component RE pattern may include YZ REs using (Y=1+max(k')) REs on the frequency axis and (Z=1+max(l')) REs on the time axis.

Figure 6:
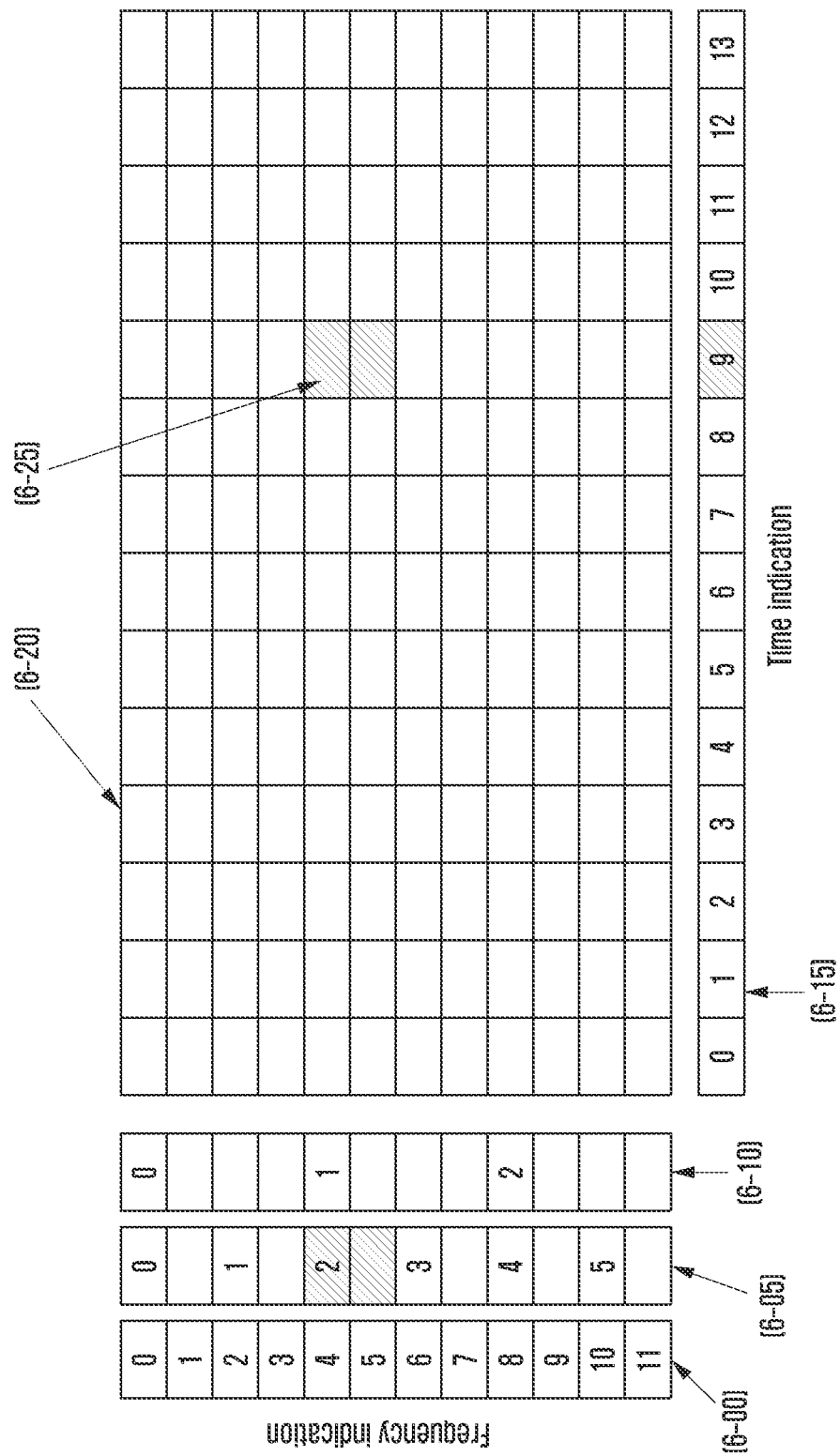
FIG. 6 illustrates an example of designating a channel state information (CSI)-reference signal (RS) resource element by CSI-RS resource mapping according to an embodiment of the disclosure.

FIG. 6 illustrates an example of designating a CSI-RS RE by CSI-RS resource mapping according to an embodiment of the disclosure.

When the number of CSI-RS ports is set such that X=2, Y=2, and Z=1, a base station may designate a frequency-axis RE location by 6-05. Here, when the base station designates a frequency-axis subcarrier location by '2' of 6-05 and a time-axis OFDM symbol location by '9' of 6-15, the terminal may know that a CSI-RS is transmitted in an RE location 6-25 in a corresponding PRB 6-20.

Referring to Table 3, NR may support different degrees of frequency-axis configuration freedom according to the number of CSI-RS ports set for a CSI-RS resource.

When the number of CSI-RS ports is 1, the CSI-RS RE location may be designated without restriction on subcarriers in the physical resource block (PRB), and the CSI-RS RE location may be designated by a 12-bit bitmap (6-00).

When the number of CSI-RS ports is 2, 4, 8, 12, 16, 24, or 32 and Y=2, the CSI-RS RE location may be designated every two subcarriers in the PRB, and the CSI-RS RE location may be designated by a 6-bit bitmap (6-05).

When the number of CSI-RS ports is 4 and Y=4, the CSI-RS RE location may be designated every four subcarriers in the PRB, and the CSI-RS RE location may be designated by a 3-bit bitmap (6-10).

Similarly, the time axis RE location may be designated by a total 14-bit bitmap (6-15).

Here, the length of the bitmap may be changed depending on Z in Table 3 as in designating the frequency location, the principle of which is similar to the above description, and thus a redundant description will be omitted herein. Table 3 shows CSI-RS locations within a slot.

TABLE 3

| Row | Ports X | Density ρ | Ccdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 +2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 +1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1) (k_0, l_1), (k_1, l_1), (k_2, l_1), (k_3, l_1), (k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Figure 7:
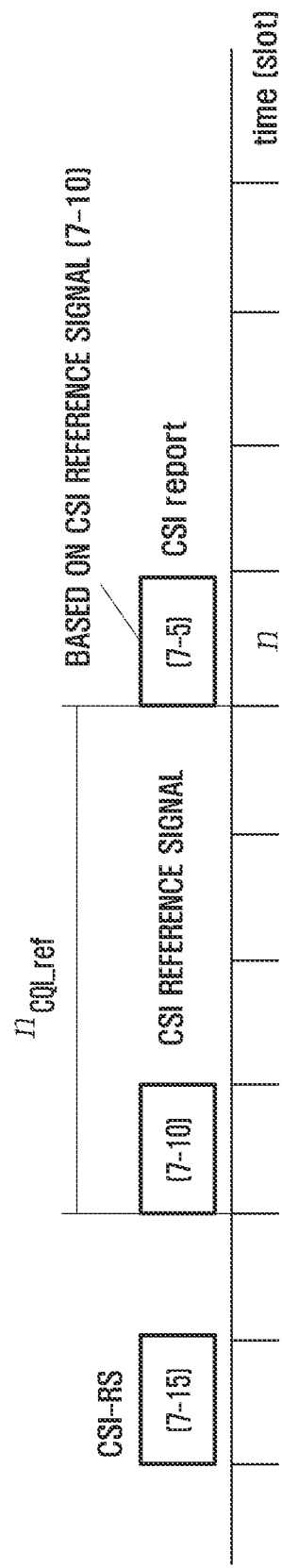
FIG. 7 illustrates a relationship between a CSI-RS reference resource and a channel state information report according to an embodiment of the disclosure.

FIG. 7 illustrates a relationship between a channel state information report, a CSI reference resource, and a CSI-RS resource.

According to an embodiment of the disclosure, a terminal may report channel state information based on one PRB or a plurality of PRBs named a CSI reference resource to a base station. In a frequency domain, the CSI reference resource may indicate a PRB in a frequency band corresponding to a wideband or subband CQI value to be reported, and the frequency band may be a frequency band for reporting the aforementioned channel state information. In a time domain, the CSI reference resource 7-10 may indicate one downlink slot corresponding to the following equation when the channel state information is reported in uplink slot n (7-5).

$$n - n_{CQI\_ref} \quad \text{Equation 1}$$

In Equation 1, in a case of semi-permanent and periodic reporting, $n_{CQ\_ref}$ may be a value that corresponds to a downlink slot closest to n and is equal to or greater than:

* $4*2^{min(\mu DL, \mu UL)}$ and when one CSI-RS resource is configured for channel measurement;
* $5*2^{min(\mu DL, \mu UL)}$ when a plurality of CSI-RS resources is configured for channel measurement. The constants μDL and UL may be values indicating downlink subcarrier spacing and uplink subcarrier spacing that are multiples of 15 kHz, respectively.

In Equation 1, in a case of aperiodic reporting, $n_{CQI\_ref}$ may indicate a downlink slot in which a CSI request is transmitted when it is configured to report the channel state information in the same slot as the downlink slot in which the CSI request is transmitted; $n_{CQI\_ref}$ may be a value that is equal to or greater than time required for the terminal to calculate the CSI and corresponds to a downlink slot closest to n in other cases.

According to an embodiment of the disclosure, when reporting channel state information, the terminal may report the channel state information measured based on a CSI-RS resource 7-15 at a time the same as or prior to that of a CSI reference resource corresponding to reporting of the channel state information.

According to an embodiment of the disclosure, the terminal may report the channel state information according to a report setting of a channel state information framework, and may use an uplink transmission resource as follows:

* A PUCCH may be used when periodic reporting is performed or when semi-persistent reporting is activated through a medium access control (MAC)-control element (CE);
* A PUSCH may be used in aperiodic reporting is performed or when semi-persistent reporting is activated through a MAC-CE.

The channel state information reported via the uplink transmission resource may be transmitted together with different control information, such as ACK/NACK information or scheduling request (SR) information, and these pieces of control information are referred to as uplink control information (UCI).

The terminal may change the size of UCI payload for reporting channel state information according to the number of CSI-RS ports in the base station, codebook information, and the type of channel state information to be reported. For example, when a type I-SinglePanel codebook is used, the number of bits required for each of a CRI, an RI, an LI, and a CQI may be determined as shown in Table 4. Table 4 shows the numbers of bits of an RI, an LI, a CQI, and a CRI when the TypeI-SinglePanel codebook is used.

TABLE 4

| Field | Bitwidth | | | | |
|---|---|---|---|---|---|
| | 1 port | 2 ports | 4 ports | >4 ports | |
| | | | | Rank1~4 | Rank5~8 |
| RI | 0 | min(1, $\lceil \log_2 n_{RI} \rceil$) | min(2, $\lceil \log_2 n_{RI} \rceil$) | $\lceil \log_2 n_{RI} \rceil$ | $\lceil \log_2 n_{RI} \rceil$ |
| LI | 0 | $\lceil \log_2 \upsilon \rceil$ | min(2, $\lceil \log_2 \upsilon \rceil$) | min(2, $\lceil \log_2 \upsilon \rceil$) | min(2, $\lceil \log_2 \upsilon \rceil$) |
| CQI (wideband) | 4 | 4 | 4 | 4 | 8 |
| CQI (subband differential) | 2 | 2 | 2 | 2 | 4 |
| CRI | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ |

In Table 4, $n_{RI}$ denotes the number of RI values allowed in a CSI report setting, and $K_S^{CRI-RS}$ denotes the number of CSI-RS resources belonging to a CSI-RS resource set.

When the typeI-SinglePanel codebook is used, the illustrative number of bits required for a PMI value may be determined as shown in Table 5. Table 5 shows the number of bits of a PMI when the TypeI-SinglePanel codebook is used.

In Table 5, $N_1$ and $N_2$ denote the number of CSI-RS ports in a first dimension in an antenna array and the number of CSI-RS ports in a second dimension in the antenna array, respectively. $O_1$ and $O_2$ denote an oversampling factor in the first dimension and an oversampling factor in the second dimension, respectively. As shown in Table 5, the number of bits required for PMI reporting may vary depending on a Table 5

| | Information field $X_1$ | | | Information field $X_2$ | |
|---|---|---|---|---|---|
| | ($i_{1,1}, i_{1,2}$) | | | $i_2$ | |
| | codebookMode = 1 | codebookMode = 2 | $i_{i,k}$ | codebookMode = 1 | codebookMode = 2 |
| Rank = 1 with > 2 CSI-RS ports, $N_2 > 1$ | $\lceil \log_2(N_1 O_1 \cdot N_2 O_2) \rceil$ | $\left\lceil \log_2\left(\frac{N_1 O_1}{2} \cdot \frac{N_2 O_2}{2}\right) \right\rceil$ | N/A | 2 | 4 |
| Rank = 1 with > 2 CSI-RS ports, $N_2 = 1$ | $\lceil \log_2(N_1 O_1 \cdot N_2 O_2) \rceil$ | $\left\lceil \log_2\left(\frac{N_1 O_1}{2}\right) \right\rceil$ | N/A | 2 | 4 |
| Rank = 2 with 4 CSI-RS ports, $N_2 = 1$ | $\lceil \log_2(N_1 O_1 \cdot N_2 O_2) \rceil$ | $\left\lceil \log_2\left(\frac{N_1 O_1}{2}\right) \right\rceil$ | 1 | 1 | 3 |
| Rank = 2 with > 4 CSI-RS ports, $N_2 > 1$ | $\lceil \log_2(N_1 O_1 \cdot N_2 O_2) \rceil$ | $\left\lceil \log_2\left(\frac{N_1 O_1}{2} \cdot \frac{N_2 O_2}{2}\right) \right\rceil$ | 2 | 1 | 3 |
| Rank = 2 with > 4 CSI-RS ports, $N_2 = 1$ | $\lceil \log_2(N_1 O_1 \cdot N_2 O_2) \rceil$ | $\left\lceil \log_2\left(\frac{N_1 O_1}{2}\right) \right\rceil$ | 2 | 1 | 3 |
| Rank = 3 or 4, with 4 CSI-RS ports | $\lceil \log_2(N_1 O_1 \cdot N_2 O_2) \rceil$ | | 0 | 1 | |
| Rank = 3 or 4, with 8 or 12 CSI-RS ports | $\lceil \log_2(N_1 O_1 \cdot N_2 O_2) \rceil$ | | 2 | 1 | |
| Rank = 3 or 4, with >= 16 CSI-RS ports | $\left\lceil \log_2\left(\frac{N_1 O_1}{2} \cdot N_2 O_2\right) \right\rceil$ | | 2 | 1 | |
| Rank = 5 or 6 | $\lceil \log_2(N_1 O_1 \cdot N_2 O_2) \rceil$ | | N/A | 1 | |
| Rank = 7 or 8, $N_1 = 4, N_2 = 1$ | $\left\lceil \log_2\left(\frac{N_1 O_1}{2} \cdot N_2 O_2\right) \right\rceil$ | | N/A | 1 | |
| Rank = 7 or 8, $N_1 > 2, N_2 = 2$ | $\left\lceil \log_2\left(N_1 O_1 \cdot \frac{N_2 O_2}{2}\right) \right\rceil$ | | N/A | 1 | |
| Rank = 7 or 8, with $N_1 > 4, N_2 = 1$ or $N_1 = 2, N_2 = 2$ or $N_1 > 2, N_2 > 2$ | $\lceil \log_2(N_1 O_1 \cdot N_2 O_2) \rceil$ | | N/A | 1 | |

CSI-RS port configuration of the base station and an RI value to be reported.

Although Table 4 and Table 5 representatively show the number of bits for the typeI-SinglePanel codebook for convenience of description, other codebooks, for example, typeI-MultiPanel, typeII, and typeII-PortSelection, may be used, in which case the numbers of bits of the RI, the LI, the CQI, the CRI, and the PMI may be changed.

The terminal may use a different order and a different method for mapping channel state information types shown in Table 4 and Table 5 depending on a transmission resource for reporting channel state information, whether wideband/subband reporting is performed, and the like. For example, a UCI payload structure for one CRI/RI/LI/PMI/CQI report including a wideband PMI and a wideband CQI in a PUCCH resource may be configured as shown in Table 6. Table 6 shows a UCI payload structure for a single channel state information report when a PUCCH resource, a wideband PMI, and a wideband CQI are used.

TABLE 6

| CSI fields |
| --- |
| CRI - See TABLE 4 for illustrative number of required bits |
| RI - See TABLE 4 for illustrative number of required bits |
| LI - See TABLE 4 for illustrative number of required bits |
| Zero padding bits $O_P$, if needed |
| PMI value $X_1$, - See TABLE 5 for illustrative number of required bits |
| PMI value $X_2$, - See TABLE 5 for illustrative number of required bits/or codebook index for 2-antenna port |
| Wideband CQI - See TABLE 4 for illustrative number of required bits |

The numbers of required bits for the CRI, the RI, the LI, the PMI, and the CQI shown in Table 6 may vary depending on a CSI report setting, such as codebook information, and when it is configured not to report a specific type of channel state information, that is, some of the CRI, the RI, the LI, the PMI, and the CQI, in the CSI report setting, the channel state information may be excluded from Table 6. In Table 4 and Table 5, the number of bits for each of the LI, PMI, and CQI values may vary depending on the value of the RI, and thus the size of UCI payload for a channel state information report of the terminal may vary depending on a channel change. Accordingly, for the base station to receive the channel state information report, blind decoding is needed as many times as the number of all possible UCI payload sizes, resulting in high decoding complexity. To solve this problem, the size of the UCI payload for the channel state information report may be always fixed by inserting zero padding as shown in Table 6, making it possible to receive the report without blind decoding and thus reducing decoding complexity.

When a change in the size of the payload is significant, for example, when a subband PMI or a subband CQI is use, the UCI payload structure of Table 6 may need a large amount of zero padding, resulting in waste of considerable payload. To solve this problem, a UCI payload structure in which a channel state information report is divided into two parts may be used. For example, a UCI payload structure for one CRI/RI/LI/PMI/CQI report including a subband PMI or a subband CQI in a PUCCH resource may include two parts as shown in Table 7 and Table 8.

Table 7 shows a payload structure for a first part of a channel state information report for a PUCCH resource, a subband PMI, or a subband CQI, and Table 8 shows a payload structure for a second part of the channel state information report for the PUCCH resource, the subband PMI, or the subband CQI.

TABLE 7

| CSI report number | CSI fields |
| --- | --- |
| CSI part 1 | CRI - See TABLE 4 for illustrative number of required bits<br>RI - See TABLE 4 for illustrative number of required bits<br>Wideband CQI for first TB - See TABLE 4 for illustrative number of required bits<br>Subband differential CQI for first TB - See TABLE 4 for illustrative number of required bits<br>Non-zero wideband amplitude coefficients $M_1$ for layer 1 when TypeII codebook is used |

TABLE 8

| CSI report number | CSI fields |
| --- | --- |
| CSI part 2 wideband | Wideband CQI for second TB - See TABLE 4 for illustrative number of required bits<br>LI - See TABLE 4 for illustrative number of required bits<br>PMI wideband value $X_1$, - See TABLE 5 for illustrative number of required bits<br>PMI wideband value $X_2$, - See TABLE 5 for illustrative number of required bits/or wideband codebook index for 2-antenna port |
| CSI part 2 subband | Differential CQI in each even-numbered subband for second TB - See TABLE 4 for illustrative number of required bits<br>PMI value $X_2$ in each even-numbered subband - See TABLE 5 for illustrative number of required bits/or each even-numbered codebook index for 2-antenna port<br>Differential CQI in each odd-numbered subband for second TB - See TABLE 4 for illustrative number of required bits<br>PMI value $X_2$ in each odd-numbered subband - See TABLE 4 for illustrative number of required bits/or each odd-numbered codebook index for 2-antenna port |

The numbers of required bits for the CRI, the RI, the LI, the PMI, and the CQI shown in Table 7 and Table 8 may vary depending on a CSI report setting, such as codebook information, and when it is configured not to report a specific type of channel state information, that is, some of the CRI, the RI, the LI, the PMI, and the CQI, in the CSI report setting, the channel state information may be excluded from Table 7 and Table 8.

The first part of the channel state information report according to Table 7 has a fixed payload size, while the second part of the channel state information report according to Table 8 may have a payload size varying depending on the RI. The base station may discover the RI by decoding the first part of the channel state information report and may then calculate the payload size of the second part of the channel state information report. Based on the payload size, the base station may decode the second part of the channel state information report without attempting blind decoding. As described above, it is possible to dynamically set the payload size of the channel state information report and to decode the channel state information report without blind decoding.

When a report resource is set as a PUSCH resource, a channel state information report may include one or two parts, in which case an example of a payload structure for a first part and a second part is as follows. Table 9 shows a payload structure for the first part of the channel state information report for the PUSCH resource.

TABLE 9

| CSI fields |
| --- |
| CRI/SSBRI - See TABLE 4 for illustrative number of required bits |
| RI - See TABLE 4 for illustrative number of required bits |
| Wideband CQI for the first TB - See TABLE 4 for illustrative number of required bits |
| Subband differential CQI for the first TB - See TABLE 4 for illustrative number of required bits |
| Non-zero wideband amplitude coefficients M1 for layer 1 when TypeII codebook is used |
| RSRP |
| Differential RSRP |

Table 10 shows a payload structure for the second part of the channel state information report for the PUSCH resource.

TABLE 10

| CSI report number | CSI fields |
| --- | --- |
| CSI part 2 wideband | Wideband CQI for second TB - See TABLE 4 for illustrative number of required bits<br>LI - See TABLE 4 for illustrative number of required bits<br>PMI wideband value $X_1$, - See TABLE 5 for illustrative number of required bits<br>PMI wideband value $X_2$, - See TABLE 5 for illustrative number of required bits/or wideband codebook index for 2-antenna port |
| CSI part 2 subband | Differential CQI in each even-numbered subband for second TB - See TABLE 4 for illustrative number of required bits<br>PMI value $X_2$ in each even-numbered subband - See TABLE 5 for illustrative number of required bits/or each even-numbered codebook index for 2-antenna port<br>Differential CQI in each odd-numbered subband for second TB - See TABLE 4 for illustrative number of required bits<br>PMI value $X_2$ in each odd-numbered subband - See TABLE 4 for illustrative number of required bits/or each odd-numbered codebook index for 2-antenna port |

Although the foregoing payload structures for the channel state information report are described based on one channel state information report, a plurality of channel state information reports may be simultaneously transmitted in one PUCCH or PUSCH resource. Here, each part of the channel state information reports may be transmitted by mapping according to Table 11 and Table 12. When each channel state information report includes one part, the part may be transmitted by mapping according to Table 11.

Table 11 shows the order in which first parts of a plurality of channel state information reports are mapped for when there is the plurality of channel state information reports.

TABLE 11

| CSI report number |
| --- |
| CSI report #1 if CSI report #1 is not of two parts, or |
| CSI report #1, CSI part 1, if CS report #1 is of two parts |
| CSI report #2 if CSI report #2 is not of two parts, or |
| CSI report #2, CSI part 1, if CSI report #2 is of two parts |
| ... |
| CSI report #n if CSI report #n is not of two parts, or |
| CSI report #n, CSI part 1, if CSI report #n is of two parts |

Table 12 shows the order in which second parts of a plurality of channel state information reports are mapped for when there is the plurality of channel state information reports.

TABLE 12

| CSI report number |
| --- |
| CSI report #1, CSI part 2 wideband |
| CSI report #2, CSI part 2 wideband |
| ... |
| CSI report #n, CSI part 2 wideband |
| CSI report #1, CSI part 2 subband |
| CSI report #2, CSI part 2 subband |
| ... |
| CSI report #n, CSI part 2 subband |

When there is no second part of a specific channel state information report in Table 12, wideband and subband channel state information reports of the report may not be mapped to Table 12.

Referring to the foregoing channel state information report structures, one channel state information report focuses on reporting of channel state information about one cell, transmission and reception point (TRP), panel, or/and beam and supports simultaneous reporting of only CRI/RSRP and SSBRI/RSRP about a plurality of cells, TRPs, panels or/and beams in Rel. 15.

Figure 8:
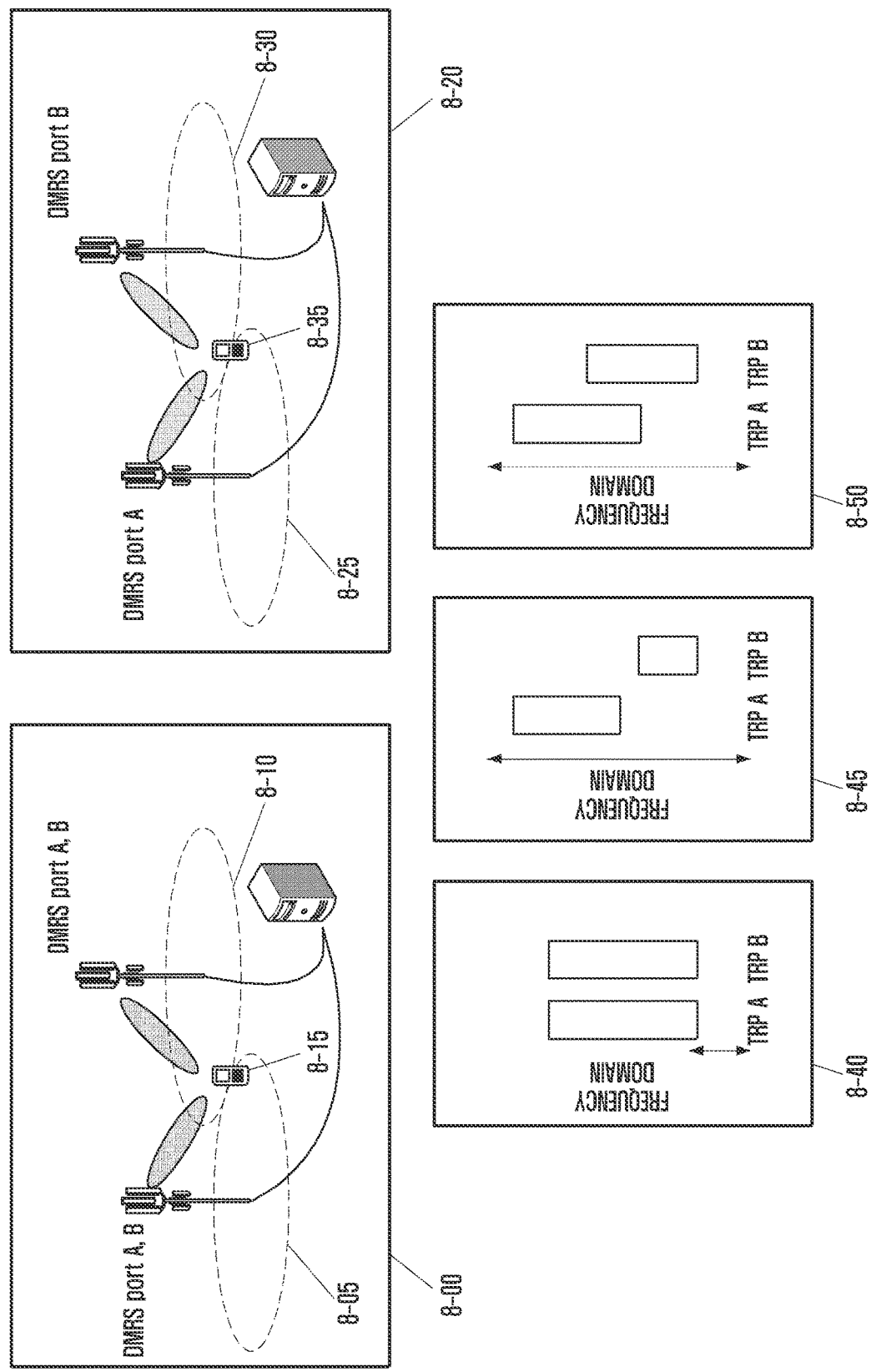
FIG. 8 illustrates a coordinated communication antenna port configuration and a resource allocation example according to an embodiment of the disclosure.

However, in coordinated transmission technology of simultaneously transmitting signals from a plurality of cells and TRPs to a single terminal to improve throughput and reliability, it may be needed to simultaneously report pieces of channel state information about a plurality of cells and TRPs via one channel state information report. In one example, as illustrated in FIG. 8, when there a plurality of TRPs around one terminal (8-00 and 8-20), the terminal may need to select n, n≥1 TRPs from among the TRPs and to report the indexes of the TRPs and channel state information, such as an RI and a CQI, about each TRP for coordinated communication. To support the operation illustrated in this example, a method of extending a UCI structure for a channel state information report is needed.

The disclosure provides a method for extending a UCI structure to enable one channel state information report to simultaneously report pieces of channel state information about a plurality of TRPs and for reducing the size of payload, such as a CRI, an RI, and an LI, in UCI, thereby improving efficiency or reliability of transmitting the channel state information report for coordinated communication compared to current Rel. 15.

Hereinafter, embodiments of the disclosure will be described in detail with reference to the accompanying drawings. When detailed descriptions about related known functions or configurations are determined to make the gist of the disclosure unclear in describing the disclosure, the detailed descriptions will be omitted herein. Also, terms used below are defined in view of functions in the disclosure and thus may be changed depending on the user, the intent of an operator, or the custom. Accordingly, the terms should be defined based on the following overall description of this specification.

Details disclosed herein are applicable to frequency division duplex (FDD) and time division duplex (TDD) systems.

In the following disclosure, higher-layer signaling is a method of transmitting a signal from a base station to a terminal using a physical-layer downlink data channel or from the terminal to the base station using a physical-layer uplink data channel and may be referred to as RRC signaling, packet data convergence protocol (PDCP) signaling, or a MAC control element (CE).

In the following disclosure, the foregoing examples will be described with reference to a plurality of embodiments.

However, these embodiments are not independent, and one or more embodiments can be applied simultaneously or in combination.

First Embodiment: Resource Allocation and Terminal Data Reception Process in Non-Coherent (NC)-Joint Transmission (JT)

Unlike conventional systems, a 5G wireless communication system can support not only services requiring a high transmission rate but also services having a very short transmission delay and services requiring a high connection density. In a wireless communication network including a plurality of cells, TRPs, or beams, coordinated transmission between cells, TRPs, and/or beams is one elementary technique for satisfying the foregoing various service requirements by increasing the strength of a signal received by a terminal or efficiently controlling interference between cells, transmission and reception points (TRPs), and/or beams.

Joint transmission (JT) is a representative transmission technique for coordinated communication and supports one terminal through different cells, TRPs, or/and beams, thus increasing the strength of a signal received by the UE. Since channels between a terminal and individual cells, TRPs, or/and beams may have significantly different characteristics, different types of precoding, MCSs, resource allocations, and the like need to be applied to links between the terminal and the individual cells, TRPs, or/and beams. Particularly, in non-coherent joint transmission (NC-JT), which supports non-coherent precoding for each cell, TRP, or/and beam, it is necessary to configure individual DL transmission information for each cell, TRP, or/and beam. Various examples of a coordinated transmission scheme and a method for configuring DL transmission information are illustrated below.

FIG. 8 illustrates examples of radio resource allocation per TRP according to a JT technique and a situation. In FIG. 8, 8-00 illustrates coherent joint transmission (C-JT) supporting coherent precoding between individual cells, TRPs, or/and beams. In C-JT, TRP A 8-05 and TRP B 8-10 transmit the same data (PDSCH) to a terminal 8-15, and a plurality of TRPs performs joint precoding, which means that TRP A 8-05 and TRP B 8-10 can transmit the same DMRS ports (e.g., both TRPs can transmit DMRS ports A and B) for receiving the same PDSCH. In this case, the terminal 8-15 receives one piece of DCI for receiving one PDSCH demodulated by DMRS ports A and B.

In FIG. 8, 8-20 illustrates non-coherent joint transmission (NC-JT) supporting non-coherent precoding between individual cells, TRPs, or/and beams. In NC-JT, the individual cells, TRPs, or/and beams may transmit data to a terminal 8-35 by applying different types of precoding thereto, which means that TRP A 8-25 and TRP B 8-30 transmit different DMRS ports (e.g., TRP A transmits DMRS port A and TRP B transmits DMRS port B) for receiving different PDSCHs to the terminal 8-35.

In this case, the cooperative TRPs in the NC-JT may transmit different PDSCHs, and the terminal may receive two types of DCI for receiving PDSCH A demodulated by DMRS port A and PDSCH B demodulated by DMRS port B via the respective PDSCHs (8-40, 8-45, and 8-50). Here, pieces of DCI for scheduling the PDSCHs by the respective TRPs may follow the same DCI format and the same payload, for example, DCI format 1_0 or DCI format 1_1 described above. Alternatively, one TRP, for example, a serving TRP used when the terminal receives a single PDSCH, may schedule a PDSCH using DCI following DCI format 1_0 or DCI format 1_1, and the other TRP may schedule a PDSCH using shortened/differential DCI including only part of the DCI format. Here, transmission cell, TRP, or/and beam information applied when receiving each PDSCH may be indicated by DCI that schedules each PDSCH, and the indicated information may be a TCI state. Alternatively, all of the cooperative TRPs in the NC-JT may perform transmission on one PDSCH but may perform the transmission with different codewords in the PDSCH, respectively. Here, transmission cell, TRP, or/and beam information (hereinafter, simply referred to as "TRP information" for convenience of description) applied when receiving each codeword may be indicated by DCI that schedules each codeword, and the indicated information may be a TCI state.

When a channel state corresponding to the TRP information indicated for each PDSCH or codeword is measured, the terminal may receive and decode the PDSCH or codeword using the channel state of a corresponding TRP, that is, beam information and precoding information obtained through the measured channel state. The following embodiments provide a method in which a terminal receives a CSI-RS transmitted from each TRP, measures channel state information about each TRP, and reports the channel state information to a base station.

In the embodiments of the disclosure, when actually applied, a "cooperative TRP" may be replaced with various terms, such as a "cooperative panel" or "cooperative beam".

In the embodiments of the disclosure, although "when NC-JT is applied" may be interpreted in various ways depending on the situation, such as "when a terminal simultaneously receives one or more PDSCHs in one BWP", "when a terminal simultaneously receives two or more TCI indications in one BWP", or "when a PDSCH received by a terminal is associated with one or more DMRS port groups", one expression is used for convenience of description.

Second Embodiment: Method for Terminal to Report Channel State Information about Each TRP When a plurality of TRPs can cooperatively transmit data to a terminal, each TRP may transmit a CSI-RS to measure a channel from each TRP to the terminal, and a set of TRPs transmitting a CSI-RS to the terminal may be referred to as a COMP measurement set. A setting for these CSI-RSs is reported to the terminal through a CSI framework described above.

The terminal may need to report channel state information about CSI-RSs from all of the TRPs in the COMP measurement set, or the terminal may need to select some TRPs from the set and then to report only channel state information about CSI-RSs from the selected TRPs. In Rel.15, when the terminal needs to report channel state information about all of the TRPs, the terminal may configure different CSI report/resource settings for the respective TRPs, thereby supporting the report. When the terminal selects some TRPs, the terminal may configure different CSI report/resource settings according to the number of cases, thereby supporting the report. However, this method may cause the following problems.

* While the number of CSI report/resource settings configurable by the terminal is limited, a number of CSI report/resource settings need to be configured for CSI report/resource settings for the respective TRPs or CSI report/resource settings depending on the number of cases in which TRPs are selectable, thus causing considerable overhead. In particular, this problem may be serious when the CoMP measurement set may have a large size, as in an indoor hotspot environment in which NC-JT may be mainly used.

\* In Rel.15, when a plurality of CSI report settings and a plurality of CSI resource settings are configured, the terminal cannot know whether the respective report and resource settings are for different TRPs or for the same TRP. Therefore, it is difficult for the terminal to reflect interference between TRPs occurring when a plurality of TRPs is used in a channel state information report, which causes a problem for NC-JT in which interference between TRPs may have a significant impact on performance.

Therefore, there is a need for a new method for supporting a channel state information report in consideration of interference between TRPs, with less overhead than in Rel. 15. Rel. 15 supports a method in which a different beam is mapped to each synchronization signal block (SSB) signal or each CSI-RS in a CSI resource set and a terminal reports a beam index as a CRI or SSBRI. Therefore, a similar method in which a different TRP in a COMP measurement set is mapped to each CSI-RS in a CSI resource set and a terminal reports a TRP index as a CRI corresponding to the CSI-RS transmitted by each TRP may be considered. This method has less overhead than the method of separately configuring the CSI report/resource setting for each TRP, because it is needed to independently transmit only a CSI-RS for each TRP. Further, when the terminal reports a plurality of CRIs, the terminal recognizes that the plurality of CRIs is reported for NC-JT and may thus reflect interference between selected TRPs in channel state information, such as an RI and a CQI, connected to the CRIs when performing the report.

Since Rel. 15 currently supports only a single CRI report except for a CRI/RSRP report, the following methods for reporting a plurality of CRIs may be considered. Table 13 shows illustrative method 1 for reporting a plurality of CRIs.

TABLE 13

| CRI value | 0 | 1 | 2 | ... |
|---|---|---|---|---|
| Indicated CSI-RS(s) | CSI-RS 1 | CSI-RS 2 | CSI-RS 1 & 2 | ... |

As shown in Table 13, a CRI value mapped to a plurality of CSI-RS indexes (CRI value 2 mapped to CSI-RSs 1 and 2 in the table), in addition to a CRI value mapped to a single CSI-RS index, may be considered. Although this table shows two CSI-RSs agreed in LTE FeCoMP for illustration for convenience of description, different numbers of CSI-RSs may be similarly applied. When the number of CSI-RSs in a CSI resource set is defined as $K_s^{CSI-RS}$ and the maximum number of selectable CSI-RSs is defined as $N_{max}^{CRI}$, the number of all cases of selecting a CSI-RS is represented CRI by the following equation.

$$M_{TOT} = \sum_{i=1}^{N_{max}^{CRI}} \binom{K_s^{CSI-RS}}{i} \qquad \text{Equation 2}$$

(Number of all Cases of Selecting CSI-RS)

When $K_s^{CSI-RS}$, $N_{max}^{CRI}$ max are given, Table 13 may be described as Table 13-1 according to Equation 2. Table 13-1 shows an illustrative relationship between a CRI value and a CSI-RS when $K_s^{CSI-RS}$, $N_{max}^{CRI}$, are given.

TABLE 13-1

| CRI value | 0 | 1 | ... | $K_s^{CSI-RS} - 1$ | $K_s^{CSI-RS}$ | ... | $M_{tot} - 1$ |
|---|---|---|---|---|---|---|---|
| Indicated CSI-RS(s) | CSI-RS 1 | CSI-RS 2 | ... | CSI-RS $K_s^{CSI-RS}$ | CSI-RS 1, 2 | ... | CSI-RS $K_s^{CSI-RS} - M_{tot} + 1, \ldots, K_s^{CSI-RS}$ |

This table is presented only for illustration, and a CRI value and a corresponding CSI-RS may be mapped in a different relationship. The total number of bits for reporting the CRI value is $[\log_2 M_{tot}]$ Each CSI-RS may be transmitted by a different TRP.

A method for reporting a CRI illustrated in the following table may be considered. Table 14 shows illustrative method 2 for reporting a plurality of CRIs.

TABLE 14

| CRI bitmap | $b_1$ | $b_2$ | ... | $b_{K_s^{CSI-RS}}$ |
|---|---|---|---|---|
| Indicated CSI-RS | CSI-RS 1 | CSI-RS 2 | ... | CSI-RS $K_s^{CSI-RS}$ |

In Table 14, when CRI value=$[b_1 \ b_2 \ \ldots \ b_{K_s^{CSI-RS}}]$ is configured, a CRI according to a bitmap method of setting a different bit value depending on whether a CSI-RS corresponding to each bit of a bitmap is selected may be considered. $b_k=1$ may be configured when a kth CSI-RS is selected where $1 \leq k \leq K_s^{CSI-RS}$, and $b_k=0$ may be configured otherwise, or vice versa. Therefore, the total number of bits for reporting the CRI value is $K_s^{CSI-RS}$. Each CSI-RS m may be transmitted by a different TRP.

Table 15 shows illustrative method 3 for reporting a plurality of CRIs.

TABLE 15

| | CRI value | Indicated CSI-RS |
|---|---|---|
| CRI #1 | 1 | 1 |
| CRI #2 | 3 | 3 |
| ... | ... | ... |
| CRI #n | K | k |

Table 13 and Table 14 show a method of mapping one reported CRI value to a plurality of CSI-RS indexes, while Table 15 shows a method in which a plurality of CRI values (n values in this example) is reported and each CRI value indicates one CSI-RS index. In this example, the number of bits required to report each CRI is $[\log_2 K_s^{CSI-RS}]$ that is the same as when reporting a single CRI. In this example, a TRP transmitting a CSI-RS may perform codebook-based transmission and may thus require a PMI report, or may perform non-codebook-based transmission and may thus not need a PMI report. In the former case, each CSI-RS may be transmitted through a different TRP. In the latter case, when each TRP considers multi-layer transmission, each CSI-RS may be transmitted through a different layer of each TRP. That is, a CSI-RS index selected with each CRI value may indicate both a TRP index and the index of a layer in a corresponding TRP. When each TRP considers only single-layer transmission, each CSI-RS may be transmitted through a different TRP.

The foregoing methods for reporting the plurality of CRIs are examples, and a CRI reporting method other than the foregoing methods may be applied. When reporting of channel state information, such as an RI and a CQI, for each CSI-RS corresponding to each CRI is needed along with CRI reporting, a UCI structure for reporting the channel state information may be optimally designed, thereby minimally reducing the payload of the channel state information and also reducing complexity of decoding a corresponding report in a base station. Examples of a UCI structure for reporting channel state information for a multi-CRI report are illustrated in the following embodiments.

Third Embodiment: Structure of Single-Part Channel State Information Report for Multi-CRI Reporting As mentioned in the Rel. 15 UCI structure for a channel state information report, when variance in channel state information payload is not significant, a channel state information report may be configured in a single part and payload size may be fixed, thereby reducing decoding complexity of a base station. Even in a channel state information report for multi-CRI reporting, when a COMP measurement set has a small size or the number of CRIs to be reported is always small, variance in channel state information payload may be considered not significant, the channel state information report may be configured in a single part. When a channel state information report is transmitted through a PUCCH resource, an example of channel state information payload is as shown in the following table.

Table 16 shows example 1 of channel state information payload transmitted through a PUCCH resource.

TABLE 16

| CSI fields |
| --- |
| CRI #1 |
| RI, LI, zero padding, PMI, Wideband CQI for CRI #1 |
| CRI #2 |
| RI, LI, zero padding, PMI, Wideband CQI for CRI #2 |
| ... |
| CRI #n |
| RI, LI, zero padding, PMI, Wideband CQI for CRI #n |

Table 16 shows an example in which a total of n CRIs and RIs, LIs, PMIs, and CQIs corresponding to the respective CRIs are sequentially listed. For convenience of description, this example is referred to as independent CRI encoding. In Table 16, n may be the size of a COMP measurement set or the maximum number of reportable CRIs set by a base station via RRC, MAC-CE/DCI, and the like. When a terminal reports less than n CRIs, the CRIs may have a value of 0, and RIs, LIs, PMIs, and CQIs corresponding to the CRIs may be subjected to zero-padding. In Table 16, values corresponding to CRI #1, . . . , CRI #n may be CRI values set by the method described in Table 11. Further, RI, LI, PMI, and CQI values corresponding to each CRI may be set according to the method described in Table 4. When it is configured not to report at least one of the RI, the LI, the PMI, and the CQI in a CSI report setting or the corresponding channel state information type does not need to be reported, the corresponding channel state information may be omitted from Table 16 and all of the following tables and embodiments.

It is also possible to configure payload by grouping CRIs as shown in the following table.

Table 17 shows example 2 of channel state information payload transmitted through a PUCCH resource.

TABLE 17

| CSI fields |
| --- |
| CRI #1, #2, . . . , #n |
| RI, LI, zero padding, PMI, Wideband CQI for CRI #1 |
| RI, LI, zero padding, PMI, Wideband CQI for CRI #2 |
| ... |
| RI, LI, zero padding, PMI, Wideband CQI for CRI #n |

Table 17 shows an example in which n CRIs are jointly encoded and an RI, an LI, a PMI, and a CQI corresponding to each CRI are sequentially listed. For convenience of description, this example is referred to as joint CRI encoding. In Table 17, n may be the value of n described in Table 16, and when the number of reported CRIs is less than n, zero-padding may be applied as in Table 16. Values corresponding to the jointly encoded CRIs in Table 17 may be CRI values set according to Table 14, Table 15, or other methods.

The payload occupied by the CRIs according to the example of Table 17 is less than that according to the example of Table 16. For example, when the number of CSI-RS resources in a CSI-RS resource set is $K_s^{CSI-RS}=8$, CRI payload is as shown in the following table.

Table 17-1 shows a CRI payload comparison according to $N_{max}^{CRI}$

TABLE 17-1

| CSI payload structure | CRI encoding method | CRI payload size (bit) | | | | | | |
| --- | --- | --- | --- | --- | --- | --- | --- | --- |
| | | $N_{max}^{CRI}$ = 2 | $N_{max}^{CRI}$ = 3 | $N_{max}^{CRI}$ = 4 | $N_{max}^{CRI}$ = 5 | $N_{max}^{CRI}$ = 6 | $N_{max}^{CRI}$ = 7 | $N_{max}^{CRI}$ = 8 |
| Joint CRI (Table 12) | Table 13-1 | 6 | 7 | 8 | 8 | 8 | 8 | 8 |
| | Table 14 | 8 | 8 | 8 | 8 | 8 | 8 | 8 |
| Independent CRI (Table 12) | Table 15 | 6 | 9 | 12 | 15 | 18 | 21 | 24 |

With $K_s^{CSI-RS}$ given, as $N_{max}^{CRI}$ increases, the difference between the payload according to the joint CRI encoding method and the payload according to independent CRI encoding method increases.

In the joint CRI encoding method, when a CRI is damaged, the entire CSI report fails to be decoded. However, in the independent CRI encoding method, even though a specific CRI is damaged, it is possible to decode an RI, an LI, a PMI, and a CQI corresponding to a normally received CRI.

To further reduce channel state information payload, it is possible to configure payload by grouping CRIs and corresponding RIs, if possible, plus LIs as shown in the following table.

Table 18 shows example 3 of channel state information payload transmitted through a PUCCH resource.

TABLE 18

| CSI fields |
| --- |
| CRI #1, #2, . . . , #n, and RIs (and LIs) for them |
| zero padding, PMI, Wideband CQI for CRI #1 |
| zero padding, PMI, Wideband CQI for CRI #2 |
| . . . |
| zero padding, PMI, Wideband CQI for CRI #n |

The location of zero padding illustrated in Table 18 may be changed (e.g., zero padding may be located between a PMI and a CQI, or after the CQI). For convenience of description, the payload structure in Table 18 is referred to as joint CRI-RI-LI encoding. An example of a joint encoding table of a CRI, an RI, and an LI for this method is as follows.

Table 18-1 shows a joint encoding table of a CRI, an RI, and an LI when rank restriction=4 per TRP, $n_{max}^{CRI}=2$, $K_s^{CSI-RS}=2$

TABLE 18-1

| Index | CRI | RI for CRI#1 | RI for CRI#2 | LI for CRI#1 | LI for CRI#2 | No. of cases | Sum of no. of cases |
| --- | --- | --- | --- | --- | --- | --- | --- |
| 0 | CRI #1 | 1 | — | — | — | 1 | 10 |
| {1, 2} | | 2 | — | {1, 2} | — | 2 | |
| {3, 4, 5} | | 3 | — | {1, 2, 3} | — | 3 | |
| {6, 7, 8, 9} | | 4 | — | {1, 2, 3, 4} | — | 4 | |
| 10 | CRI #2 | — | 1 | — | — | 1 | 10 |
| {11, 12} | | — | 2 | — | {1, 2} | 2 | |
| {13, 14, 15} | | — | 3 | — | {1, 2, 3} | 3 | |
| {16, 17, 18, 19} | | — | 4 | — | {1, 2, 3, 4} | 4 | |
| 20 | CRI #1, #2 | 1 | 1 | — | — | 1 | 100 |
| {21, 22} | | 1 | 2 | — | {1, 2} | 2 | |
| {23, 24} | | 2 | 1 | {1, 2} | — | 2 | |
| {25, 26, 27 28} | | 2 | 2 | {1, 2} | {1, 2} | 4 | |
| {29, 30} | | 3 | 1 | {1, 2, 3} | — | 3 | |
| {31, 32, 33} | | 1 | 3 | — | (1, 2, 3) | 3 | |
| . . . | . . . | . . . | . . . | . . . | . . . | | |

When the terminal reports a value corresponding to an index in the encoding table, the base station may discover a CRI, an RI, and an LI from the value. Although the encoding table employs the method of Table 13-1 for multi-CRI reporting, another method, for example, the method of Table 14, may be used.

When the encoding table is used, the total number of bits required to transmit a CRI, an RI, and an LI is $[\log_2 120]=7$ bits. However, when separate CRI encoding is used, 1 bit for each CRI and 2 bits for each of an RI and an LI corresponding to the CRI are required and up to two CRIs are reported, and thus a total of 2*(1+2+2)=10 bits are required. In addition, when joint CRI encoding is used, joint CRIs require 2 bits and an RI and an LI for each CRI require the same number of bits as in separate CRI encoding, and thus a total of 10 bits are required. Therefore, joint CRI-RI-LI encoding can save 3 bits compared to separate/joint CRI encoding. In addition, when $n_{max}^{CRI}$ and $K_s^{CSI-RS}$ increase, the number of bits saved by joint CRI-RI-LI encoding may further increase. The encoding method used in Table 14-1 may be similarly used for other rank restrictions and values of $n_{max}^{CRI}$ and $K_s^{CSI-RS}$.

Figure 9:
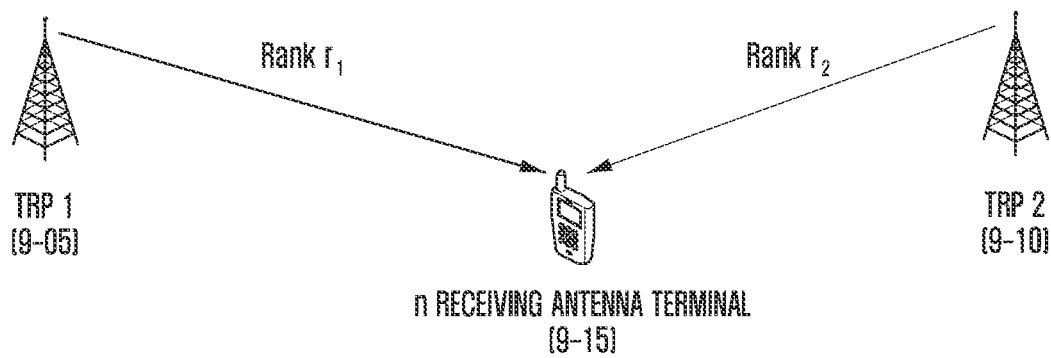
FIG. 9 illustrates a situation in which coordinated transmission is efficient in terms of terminal throughput and a situation in which coordinated transmission is not efficient in terms of terminal according to an embodiment of the disclosure.
Figure 9:
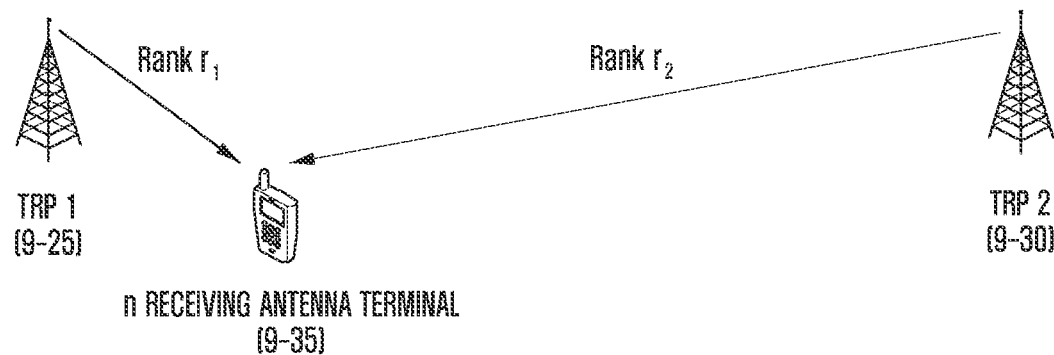

When a channel state information report is a report for NC-JT, the encoding table may be additionally optimized, thereby further reducing the number of required bits. FIG. 9 illustrates transmission characteristics of NC-JT that can be used for optimizing the encoding table.

FIG. 9 shows that NC-JT from two TRPs is efficient in a situation 9-01 where both TRP 1 9-05 and TRP 2 9-10 have low and similar ranks and the sum of the ranks of the two TRPs is not greater than the number of receiving antennas of a terminal 9-15. That is, when the terminal simultaneously receives pieces of data from the two TRPs in a situation where the throughput of the terminal for data received from each TRP is significantly less than the maximum throughput of the terminal for data that can be received, the data throughput of the terminal can be significantly improved. However, FIG. 9 shows that transmission only by TRP 1 without NC-JT is adequate in a situation 9-20 where the rank of TRP 1 is much greater than the rank of TRP 2, because a terminal 9-35 has a significantly lower throughput for data received from TRP 2 than that for data from TRP 1 and thus obtains an insignificant gain in throughput from transmission by TRP 2.

Using the above transmission characteristics, the following methods may be applied to reduce the number of cases when reporting two CRIs in Table 18-1 (when available for a CSI report for multi-TRPs).

*Excluding a row in which the difference in rank between TRPs is great (e.g., excluding a row in which the difference between RIs is greater than x when reporting CRI #1 and #2)

*Excluding a row in which a TRP has a great rank (e.g., excluding a row in which one or more RIs are greater than y when reporting CRI #1 and #2)

When the above methods are applied to Table 18-1, a joint encoding table is as follows.

Table 18-2 shows a joint encoding table when x=1 and y=2.

TABLE 18-2

| Index | CRI | RI for CRI #1 | RI for CRI #2 | LI for CRI #1 | LI for CRI #2 | No. of cases | Sum of no. of cases |
|---|---|---|---|---|---|---|---|
| 0-19 | | Same as in Table 14-1 | | | | | 20 |
| 20 | CRI #1, #2 | 1 | 1 | — | — | 1 | 9 |
| {21, 22} | | 1 | 2 | — | {1, 2} | 2 | |
| {23, 24} | | 2 | 1 | {1, 2} | — | 2 | |
| {25, 26, 27, 28} | | 2 | 2 | {1, 2} | {1, 2} | 4 | |

When the encoding table is used, the total number of bits required to transmit a CRI, an RI, and an LI is $[\log_2 29]=5$ bits, and 2 bits may be saved compared to Table 18-1. Even when $n_{max}^{CRI}$, $K_s^{CRI-RS}$, and y are different values, the number of cases of a joint encoding table may be reduced by applying the above methods, and the number of saved bits may vary accordingly.

A joint CRI-RI encoding table may be configured by excluding the LIs from the joint encoding tables shown in Table 18-1 and Table 18-2. Here, the LI for each CRI may be grouped together with the PMI and the CQI for each CRI shown in Table 14. The joint CRI-RI encoding tables may be configured by applying the same method for configuring the joint CRI-RI-LI encoding table described above.

In particular, when a restriction for an RI is set and the value of the restriction is 4, that is, when an RI restriction corresponding to NC-JT of a single CW (rank 4 or less) is set in two TRPs based on NR, a joint RI encoding table of the two TRPs may be, by reflecting the above transmission characteristics, as shown in Table 18-3.

TABLE 18-3

| RI index | RI1 | RI2 |
|---|---|---|
| 1 | 1 | 1 |
| 2 | 1 | 2 |
| 3 | 2 | 1 |
| 4 | 2 | 2 |

A joint LI encoding table of the two TRPs may be as shown in Table 18-4.

TABLE 18-4

| LI index | LI1 | LI2 |
|---|---|---|
| 1 | 1 | 1 |
| 2 | 1 | 2 |
| 3 | 2 | 1 |
| 4 | 2 | 2 |

When an RI and/or an LI for NC-JT is reported according to the RI and/or LI encoding tables, a bit field size for reporting each of the RI and/or the LI may be the same as a bit field size for RI and/or LI reporting in a case where an RI restriction for CSI reporting of a single TRP is set to 4, that is, in a case where an RI restriction corresponding to single CW (rank 4 or less) transmission is set.

For convenience of description, the third embodiment has been described with reference to a channel state information report transmitted through a PUCCH resource but may be equally applied to a channel state information report transmitted through a PUSCH resource.

Fourth Embodiment: Structure of Multi-Part Channel State Information Report for Multi-CRI Reporting As mentioned in the Rel. 15 UCI structure for a channel state information report, when variance in channel state information payload may be significant, a channel state information report may be configured in a plurality of parts and payload size may be dynamically set. Even in a channel state information report for multi-CRI reporting, when a COMP measurement set has a large size or the number of CRIs to be reported is significantly changed, the channel state information report may be configured in a plurality of parts.

When channel state information payload is configured in a plurality of parts in multi-CRI reporting, a first part having fixed payload may indicate information, such as whether a second part exists and, if the second part exists, the payload size of the part. The information may be implicitly indicated in the first part or may be explicitly indicated through an indicator or the like.

For convenience of description, this embodiment will first be described with reference to a case where a wideband PMI and CQI are reported in a PUCCH resource. In this case, according to a method for implicitly indicating the information about the second part (referred to as a first example) when reporting channel state information, all CRI values and an RI and wideband CSI about a first codeword corresponding to each CRI are included in the first part, and a variable payload value, for example, an LI, a PMI and an CQI of a second codeword corresponding to each CRI corresponding to each CRI, may be included in the second part. When the first part is successfully decoded, it is possible to identify whether the payload of the second part exists and the size of the payload through the CRIs and the RIS corresponding to the CRIs. For example, a CRI value reported in the first part is 0 or an RI value corresponding to a specific CRI is 0 or 1, an LI, a PMI and a CQI of a second codeword corresponding to each CRI corresponding to the CRI do not need to be reported, thus determining that there is no second part corresponding to the CRI. When a specific CRI value is not 0 and an RI value corresponding to the CRI is 2 or greater, the values of an LI, a PMI and a CQI of a second codeword corresponding to the CRI may be determined to be similar to those in single CRI reporting (in Table 8 and Table 10) through the RI value. Illustrative structures of the respective parts described above are shown in Table 19 and Table 22.

Table 19 shows a first example of a multi-part CSI payload structure for multi-CRI reporting—example 1 of the first part.

TABLE 19

| CSI fields |
| --- |
| CRI #1 |
| CRI #2 |
| ... |
| CRI #n |
| RI for CRI #1 |
| RI for CRI #2 |
| ... |
| RI for CRI #n |
| Wideband CQI of $1^{st}$ codeword for CRI #1 |
| Wideband CQI of $1^{st}$ codeword for CRI #2 |
| ... |
| Wideband CQI of $1^{st}$ codeword for CRI #n |

In the payload of the above table, n CRIs are independently listed, that is, the method of Table 15 is used for CRI reporting, but a different method, such as the joint CRI method illustrated in Table 13-1 and Table 14 may be used. Further, the order of the channel state information types in the table may be changed. For example, the channel state information types may be listed as in the following table.

Table 20 shows the first example of the multi-part CSI payload structure for multi-CRI reporting—example 2 of the first part.

TABLE 20

| CSI fields |
| --- |
| CRI #1 or joint CRI |
| RI for CRI #1 |
| Wideband CQI of $1^{st}$ codeword for CRI #1 |
| CRI #2 (not exist if joint CRI is used) |
| RI for CRI #2 |
| Wideband CQI of $1^{st}$ codeword for CRI #2 |
| ... |
| CRI #n (not exist if joint CRI is used) |
| RI for CRI #n |
| Wideband CQI of $1^{st}$ codeword for CRI #n |

The above two tables are merely examples, and the channel state information types may be listed in a different order. In the above two tables, n may be a fixed value, for example, $n_{max}^{CRI}$ set through a higher layer. Further, in the above two tables, the CRIs and the RIs, or the CRIs, the RIs, and the LIs may be jointly encoded as shown in Table 17. When the LIs are encoded in the first part, the LIs may be omitted in the second part.

When subband PMI/CQI reporting is configured in a PUCCH resource, a subband differential CQI and non-zero wideband amplitude coefficients for each CRI (when using the typeII codebook) may be added to the first part as described in Table 7.

The payload of the second part may be listed as follows.

Table 21 shows the first example of the multi-part CSI payload structure for multi-CRI reporting—example 1 of the second part.

TABLE 21

| CSI fields |
| --- |
| CSI part2 wideband for CRI #1 |
| CSI part2 wideband for CRI #2 |
| ... |
| CSI part2 wideband for CSI #n |
| CSI part2 subband for CRI #1 (if exist) |

TABLE 21-continued

| CSI fields |
| --- |
| CSI part2 subband for CRI #2 (if exist) |
| ... |
| CSI part2 subband for CRI (if exist) |

When wideband PMI and wideband CQI reporting is configured, a CSI part2 wideband for each CRI in the above table may be the LI and PMI values illustrated in Table 6 and the wideband CQI of a second codeword, and a part2 subband may be omitted. When subband PMI/CQI reporting is configured, a part2 wideband and a part2 subband for each CRI in the above table may refer to the values illustrated in Table 8, which are used in single CRI reporting. When an LI is encoded in the first part, the LI may be omitted in the second part. When a CRI value corresponding to the part2 wideband/subband or an RI value corresponding to the CRI value is 0, reporting of the part2 wideband/subband report is useless and may thus be omitted.

The above table is merely an example, and the channel state information may be listed in a different manner. For example, the channel state information may be listed as shown in Table 22, or may be listed in a different manner.

Table 22 shows the first example of the multi-part CSI payload structure for multi-CRI reporting—example 2 of the second part.

TABLE 22

| CSI fields |
| --- |
| CSI part2 wideband ter CRI #1 |
| CSI part2 subband for CRI #1 (if exist) |
| CSI part2 wideband for CRI #2 |
| CSI part2 subband for CSI #2 (if exist) |
| ... |
| CSI part2 wideband for CRI #n |
| CSI part2 subband for CRI #n (if exist) |

Although this example has been described with reference to a case where reporting is performed in a PUCCH resource, a case where reporting is performed in a PUSCH resource may also be similarly described according to the structures of Table 9 and Table 10 for single CRI reporting.

In the first example of the payload structure described above, since the information about the second part is implicitly obtained from the CRI and RI values in the first part, it is not necessary to separately indicate the information about the second part. However, the first example always has a size corresponding to a fixed number (n in this example) of CRIs, RIs, and wideband CQIs for a first codeword, and when some CRIs are not reported, the CRIs and RIs and CQIs for a first codeword corresponding to the CRIs may be subjected zero-padding, thus wasting the payload.

In a second example of the payload structure below, a method of locating second and subsequent CRIs in the second part is disclosed. For convenience of description, a description will be made first with reference to a case where wideband PMI and CQI reporting is performed in a PUCCH resource, and Table 23 shows an illustrative structure of the first part of the second example.

Table 23 shows a second example of the multi-part CSI payload structure for multi-CRI reporting—an example of the first part.

TABLE 23

| CSI fields |
| --- |
| CRI #1 |
| RI for CRI #1 |
| Wideband CQI of $1^{st}$ codeword for CRI #1 |
| Indicator for part 2 |

An indicator of the second part illustrated in the above table may be a value indicating whether second and subsequent CRIs exist (and sizes thereof). The indicator may be expressed by a plurality of methods. For example, the indicator may have a binary value of 0 or 1, wherein 0 may indicate that the second and subsequent CRIs are not reported and 1 may indicate the second and subsequent CRIs are reported. 0/1 may have the opposite of the above meanings. Alternatively, the indicator may have a value ranging from 0 to $n_{max}^{CRI}$ and may indicate the number of CRIs reported in the second part.

When subband PMI/CQI reporting is configured in a PUCCH resource, a subband differential CQI and non-zero wideband amplitude coefficients for each CRI (when using the typeII codebook) may be added to the first part as in example 1.

The payload of the second part may be described as follows.

Table 24 shows the second example of the multi-part CSI payload structure for multi-CRI reporting—example 1 of the second part.

TABLE 24

| CSI fields |
| --- |
| CRI #2, RI and wideband CQI of $1^{st}$ codeword for CRI #2 |
| ... |
| CRI #n, RI and wideband CQI of $1^{st}$ codeword for CRI #n |
| CSI part2 wideband for CRI #1 |
| CSI part2 wideband for CRI #2 |
| ... |
| CSI part2 wideband for CSI #n |
| CSI part2 subband for CRI #1 (if exist) |
| CSI part2 subband for CRI #2 (if exist) |
| ... |
| CSI part2 subband for CRI #n (if exist) |

The above table shows an example in which when an indicator of the first part indicates whether the second and subsequent CRIs exist or the number of CRIs, the second part includes the values of the second and subsequent CRIs and RIs and wideband CQIs for a first codeword corresponding to the respective CRIs. Further, remaining channel state information values (CSI part2 wideband/subband) for first and subsequent CRIs may be included, and these values may be the same as those illustrated in Table 21 and Table 22.

When the indicator of the first part has a binary value, the value of n in the table may be $n_{max}^{CRI}$. When the indicator of the first part indicates the number of reported CRIs, the value of n in the table may be a value indicated by the indicator. In the above table, each CRI, each CRI and each RI, or each CRI, each RI, and each LI may be jointly encoded, and encoding may be performed according to the methods described in the second and third embodiments. When the CRI, the RI, and the LI are jointly encoded, the LI may be omitted in CSI part2 widebands for CRIs #2, . . . , #n. The order of items listed in the above table may be changed. For example, as shown in Table 21 and Table 22, part2 widebands and subbands may be changed. Although this example has been described with reference to a case where reporting is performed in a PUCCH resource, a case where reporting is performed in a PUSCH resource may also be described similarly to that in the first example.

In the table, the size of CSI part2 widebands/subbands for CRI #2, . . . , CRI #n, that is, the size of PMIs and CQIs of a second codeword for CRI #2, . . . , and CRI #n, cannot be identified at the time of receiving the second part, and thus the size of the CSI part2 widebands/subbands needs to be fixed in order that the base station does not perform blind decoding. This may cause waste of payload due to a large quantity of zero padding in some cases. Therefore, the following structure may be considered to reduce waste of payload.

Table 25 shows the second example of the multi-part CSI payload structure for multi-CRI reporting—example 2 of the second part.

TABLE 25

| CSI fields |
| --- |
| CRI #2, RI and wideband CQI of $1^{st}$ codeword for CRI #2 |
| ... |
| CRI #n, RI and wideband CQI of $1^{st}$ codeword for CRI #n |
| CSI part2 wideband for CRI #1 |
| CSI part2 subband for CRI #1 (if exist) |

The above table shows an example in which only elements having a payload size that is already known or is not significantly changed among the elements in Table 24 are disposed in the second part. The CSI part2 wideband/subband elements for CRIs #2, . . . , #n are disposed in a new part, for example, a third part. A CSI payload structure for the third part may be configured as shown in the following table.

Table 26 shows the second example of the multi-part CSI payload structure for multi-CRI reporting—the third part.

TABLE 26

| CSI fields |
| --- |
| CSI part2 wideband for CRI #2 |
| ... |
| CSI part2 wideband for CSI #n |
| CSI part2 subband for CRI #2 (if exist) |
| ... |
| CSI part2 subband for CRI #n (if exist) |

The payload size of the third part illustrated in the above table may be identified by decoding an RI value corresponding to each CRI in the second part. Therefore, the structure needs less zero padding that in the structure illustrated in Table 24, thus reducing waste of payload.

Figure 10:
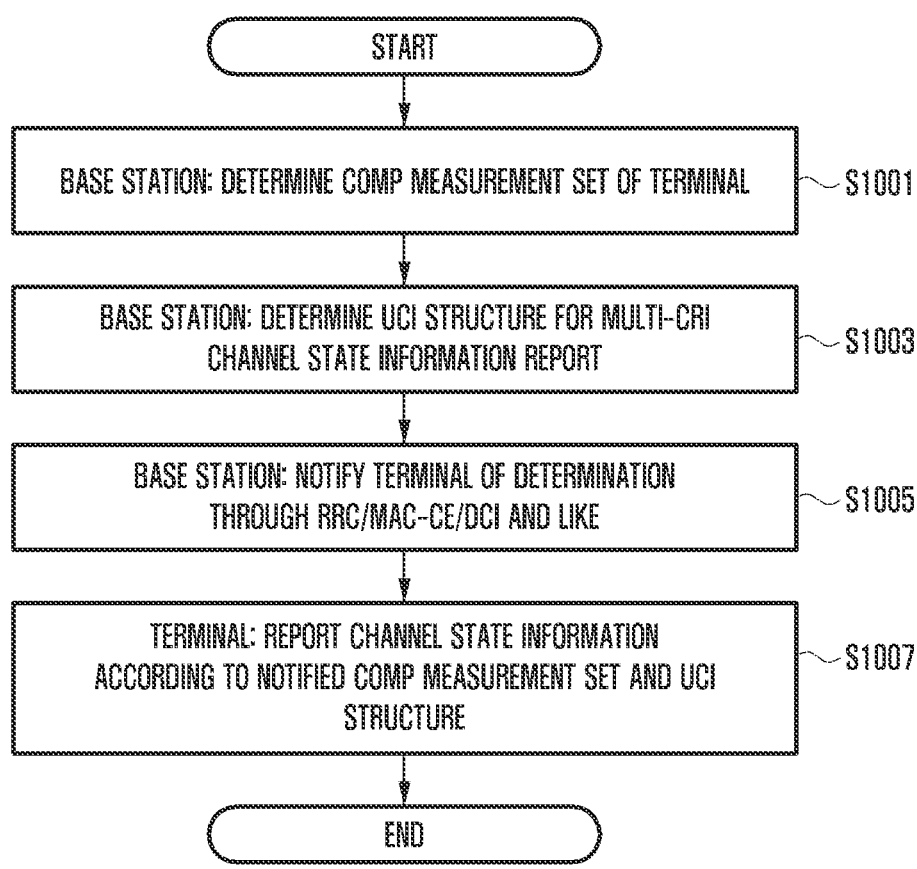
FIG. 10 is a flowchart illustrating the operations of a base station and a terminal according to an embodiment of the disclosure.

According to the characteristics of the respective embodiments described above, the base station may indicate which method is used to report channel state information for each CRI to the terminal. FIG. 10 illustrates a channel state information report setting by a base station for a terminal and a corresponding operation of the terminal.

First, the base station determines a COMP measurement set for the terminal to measure a channel state (S1001). Here, the distance between the terminal and a TRP, the load of the TRP, or the like may be considered. Here, the size of the COMP measurement set may be 2 or greater.

The base station determines a UCI structure for a multi-CRI channel state information report (S1003), which may include a channel state information framework, and single/multi-part CSI payload and joint/separate encoding of a CRI/CRI and RI/CRI, RI, and LI described in the second, third, and fourth embodiments.

The base station notifies the terminal of the determination through RRC/MAC-CE/DCI and the like (S1005), in which the channel state information framework may be notified through RRC. In the UCI structure, the single/multi-part payload and joint/separate encoding settings described in the above embodiments may be implicitly determined (e.g., when the CoMP measurement set is small and wideband PMI/CQI reporting is performed via a PUCCH resource, single-part payload and separate encoding are configured), may be included in the channel state information framework by the base station, or may be explicitly notified to the terminal through different control information.

The terminal reports channel state information to the base station according to the CoMP measurement set notified by the base station and the UCI structure implicitly determined/explicitly notified (S1007). Although not explicitly shown in FIG. 10, the terminal may receive information for configuring the CoMP measurement set determined by the base station from the base station, and the terminal may receive information about the UCI structure for the multi-CRI channel state information report (e.g., the CSI framework, and the single/multi-part CSI payload and whether pieces of information included in UCI are subjected to joint/separate encoding described in the foregoing embodiments) from the base station. The terminal may receive the foregoing pieces of information separately or together through at least one signaling of RRC/MAC-CE/DCI.

Figure 11:
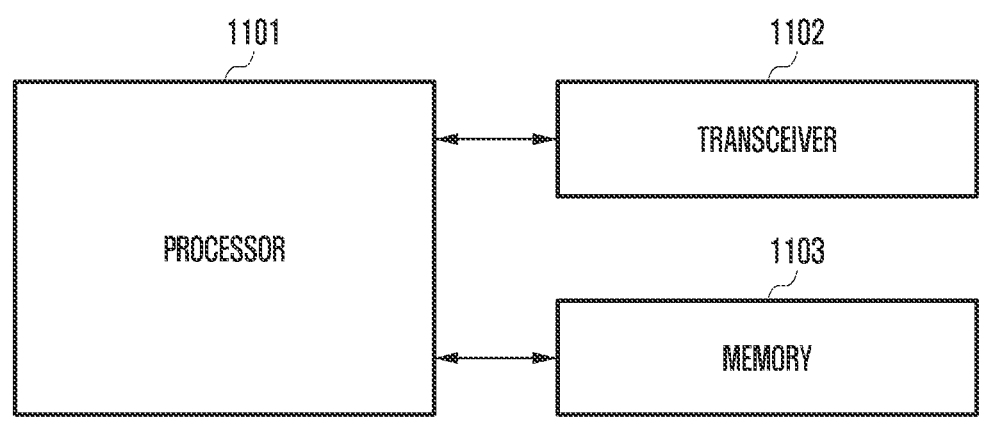
FIG. 11 illustrates the structure of a terminal according to an embodiment of the disclosure.

FIG. 11 illustrates the structure of a terminal according to an embodiment of the disclosure.

Referring to FIG. 11, the terminal may include a processor 1101, a transceiver 1102, and a memory 1103. In the disclosure, the processor may be defined as a circuit, an application-specific integrated circuit, or at least one processor or may include a controller.

The processor 1101 according to an embodiment of the disclosure may control the overall operation of the terminal. For example, the processor 1101 may control signal flow between blocks to perform the operation according to the foregoing flowchart. The processor 1101 may record and read data in the memory 1103. The processor 1101 may perform functions of a protocol stack required in communication standards. To this end, the processor 1101 may include at least one processor or microprocessor or may be part of a processor. Part of the transceiver 1102 and the processor 1101 may be referred to as a communication processor (CP).

According to an embodiment of the disclosure, the processor 1101 may control operations of the terminal described with reference to FIGS. 1 to 10.

According to an embodiment of the disclosure, the processor 1101 may execute a program stored in the memory 1103, thereby reporting whether to support activating an antenna to a base station, receiving antenna activation indication information from the base station, and determining whether to activate the antenna based on the received antenna activation indication information.

The transceiver 1102 according to an embodiment of the disclosure may perform functions for transmitting or receiving a signal through a radio channel.

For example, the transceiver 1102 may perform a function of converting between a baseband signal and a bit stream according to the physical layer specification of a system. For example, in data transmission, the transceiver 1102 may encode and modulate a transmitted bit stream to generate complex symbols. Further, in data reception, the transceiver 1102 may demodulate and decode a baseband signal to reconstruct a received bit stream. The transceiver 1102 may upconvert a baseband signal into an RF band signal and may transmit the RF band signal through an antenna. The transceiver 1102 may downconvert an RF band signal, received through the antenna, into a baseband signal. For example, the transceiver 1102 may include a transmission filter, a reception filter, an amplifier, a mixer, an oscillator, a DAC, an ADC, or the like. Further, the transceiver 1102 may include a plurality of transmission/reception paths. In addition, the transceiver 1102 may include at least one antenna array including a plurality of antenna elements. In view of hardware, the transceiver 1102 may include a digital circuit and an analog circuit (e.g., a radio frequency integrated circuit (RFIC)). Here, the digital circuit and the analog circuit may be configured as a single package. Further, the transceiver 1102 may include a plurality of RF chains.

The transceiver 1102 may transmit and receive a signal to and from the base station. Here, the signal may include control information and data. To this end, the transceiver 1102 may include an RF transmitter to upconvert and amplify the frequency of a transmitted signal and an RF receiver to low-noise amplify and downconvert a received signal. However, this configuration is merely an example of the transceiver 1102, and components of the transceiver 1102 are not limited to the RF transmitter and the RF receiver.

Further, the transceiver 1102 may receive a signal through the radio channel to output the signal to the processor 1101 and may transmit a signal output from the processor 1101 through the radio channel.

The memory 1103 according to an embodiment of the disclosure may store a basic program, an application program, and data, such as configuration information, for the operation of the terminal. The memory 1103 may be configured as a volatile memory, a nonvolatile memory, or a combination of a volatile memory and a nonvolatile memory. The memory 1103 may provide stored data according to a request from the processor 1101. The memory 1103 may store at least one of information transmitted or received through the transceiver 1102 and information generated through the processor 1101.

Figure 12:
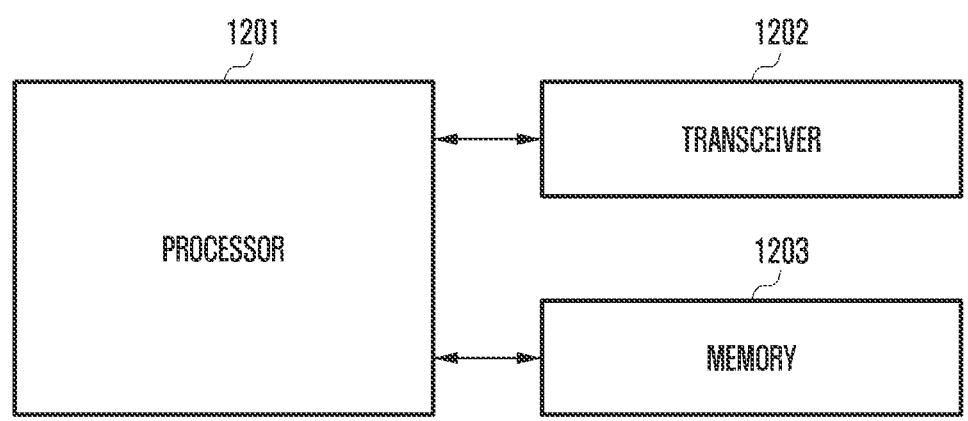
FIG. 12 illustrates the structure of a base station according to an embodiment of the disclosure.

FIG. 12 illustrates the structure of a base station according to an embodiment of the disclosure.

Referring to FIG. 12, the base station may include a processor 1201, a transceiver 1202, and a memory 1203. In the disclosure, the processor may be defined as a circuit, an application-specific integrated circuit, or at least one processor or may include a controller.

The processor 1201 according to an embodiment of the disclosure may control the overall operation of the base station. For example, the processor 1201 may control signal flow between blocks to perform the operation according to the foregoing flowchart. The processor 1201 may record and read data in the memory 1203. The processor 1201 may perform functions of a protocol stack required in communication standards. To this end, the processor 1201 may include at least one processor or microprocessor or may be part of a processor. Part of the transceiver 1202 and the processor 1201 may be referred to as a communication processor (CP).

According to an embodiment of the disclosure, the processor 1201 may control operations of the base station described with reference to FIGS. 1 to 10.

According to an embodiment of the disclosure, the processor 1201 may control a series of processes so that the base station may operate according to the foregoing embodiments of the disclosure.

According to an embodiment of the disclosure, the processor 1201 may execute a program stored in the memory 1203, thereby receiving a report on whether to support activating an antenna from a terminal and transmitting antenna activation indication information to the terminal based on the received report on whether to support activating the antenna.

The transceiver 1202 according to an embodiment of the disclosure may perform functions for transmitting or receiving a signal through a radio channel. For example, the transceiver 1202 may perform a function of converting between a baseband signal and a bit stream according to the physical layer specification of a system. For example, in data transmission, the transceiver 1202 may encode and modulate a transmitted bit stream to generate complex symbols. Further, in data reception, the transceiver 1202 may demodulate and decode a baseband signal to reconstruct a received bit stream. The transceiver 1202 may upconvert a baseband signal into an RF band signal and may transmit the RF band signal through an antenna. The transceiver 1202 may downconvert an RF band signal, received through the antenna, into a baseband signal. For example, the transceiver 1202 may include a transmission filter, a reception filter, an amplifier, a mixer, an oscillator, a DAC, an ADC, or the like. Further, the transceiver 1202 may include a plurality of transmission/reception paths. In addition, the transceiver 1202 may include at least one antenna array including a plurality of antenna elements. In view of hardware, the transceiver 1202 may include a digital circuit and an analog circuit (e.g., a radio frequency integrated circuit (RFIC)). Here, the digital circuit and the analog circuit may be configured as a single package. Further, the transceiver 1202 may include a plurality of RF chains.

The transceiver 1202 may transmit and receive a signal to and from the terminal. Here, the signal may include control information and data. To this end, the transceiver 1202 may include an RF transmitter to upconvert and amplify the frequency of a transmitted signal and an RF receiver to low-noise amplify and downconvert a received signal. However, this configuration is merely an example of the transceiver 1202, and components of the transceiver 1202 are not limited to the RF transmitter and the RF receiver.

Further, the transceiver 1202 may receive a signal through the radio channel to output the signal to the processor 1201 and may transmit a signal output from the processor 1201 through the radio channel.

The memory 1203 according to an embodiment of the disclosure may store a basic program, an application program, and data, such as configuration information, for the operation of the base station. The memory 1203 may be configured as a volatile memory, a nonvolatile memory, or a combination of a volatile memory and a nonvolatile memory. The memory 1203 may provide stored data according to a request from the processor 1201. The memory 1203 may store at least one of information transmitted or received through the transceiver 1202 and information generated through the processor 1201.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method for transmitting channel state information (CSI) performed by a terminal in a wireless communication system, the method comprising:
receiving CSI configuration information including information on a plurality of reference signals associated with a plurality of transmission and reception points (TRPs);
receiving a plurality of CSI reference signals (CSI-RSs) associated with the plurality of TRPs;
generating the CSI associated with the plurality of TRPs based on the plurality of CSI-RSs, wherein the CSI comprises a CSI-RS resource indicator (CRI) indicating a subset of the plurality of CSI-RSs; and
transmitting the CSI,
wherein a value of the CRI is one of integers from 0 to $M_{tot}-1$, and each value of the CRI maps to a specific subset of the plurality of CSI-RSs, where $M_{tot}$ is an integer, and
wherein a bitwidth of the CRI is $\lceil \log_2 M_{tot} \rceil$.

2. The method as claimed in claim 1, wherein the CSI further comprises at least one of rank indicator (RI), a channel quality indicator (CQI), a precoding matrix index (PMI) or a layer indicator (LI) corresponds to the CRI.

3. The method as claimed in claim 1, wherein the CSI-RSs indicated by the CRI are included in a CSI-RS resource set of the CSI configuration information.

4. The method as claimed in claim 1, wherein the $M_{tot}$ is sum of a number of single CSI-RSs and a number of possible combinations of CSI-RSs among the plurality of CSI-RSs.

5. The method as claimed in claim 1,
wherein the CSI is transmitted on a physical uplink shared channel (PUSCH) for aperiodic reporting of the CSI, or
wherein the CSI is transmitted on a physical uplink control channel (PUCCH) for semi-persistent reporting of the CSI.

6. The method as claimed in claim 1, wherein the $M_{tot}$ is a number of subsets of the plurality of CSI-RSs.

7. A method for receiving channel state information (CSI) performed by a transmission and reception point (TRP) in a wireless communication system, the method comprising:
transmitting, to a terminal, CSI configuration information including information on a plurality of reference signals from a plurality of TRPs;
transmitting at least one CSI reference signal (CSI-RS) to the terminal; and
receiving the CSI generated based on a plurality of CSI-RSs, wherein the CSI comprises a CSI-RS resource indicator (CRI) indicating a subset of the plurality of CSI-RSs,
wherein a value of the CRI is one of integers from 0 to $M_{tot}$-1, and each value of CRI maps to a specific subset of the plurality of CSI-RSs, where $M_{tot}$ is an integer, and
wherein a bitwidth of the CRI is $[\log_2 M_{tot}]$.

8. The method as claimed in claim 5, wherein the CSI further comprises at least one of rank indicator (RI), a channel quality indicator (CQI), a precoding matrix index (PMI) or a layer indicator (LI) corresponds to the CRI.

9. The method as claimed in claim 5,
wherein the value $M_{tot}$ is sum of a number of single CSI-RSs and a number of possible combinations of CSI-RSs among the plurality of CSI-RSs.

10. The method as claimed in claim 7, wherein the $M_{tot}$ is a number of subsets of the plurality of CSI-RSs.

11. A terminal for transmitting channel state information (CSI) in a wireless communication system, the terminal comprising:
a transceiver configured to transmit and receive a signal; and
a controller configured to:
receive CSI configuration information including information on a plurality of reference signals associated with a plurality of transmission and reception points (TRPs),
receive a plurality of CSI reference signals (CSI-RSs) associated with the plurality of TRPs,
generate the CSI associated with the plurality of TRPs based on the plurality of CSI-RSs, wherein the CSI comprises a CSI-RS resource indicator (CRI) indicating a subset of the plurality of CSI-RSs, and
transmit the CSI,
wherein a value of the CRI is one of integers from 0 to $M_{tot}$-1, and each value of the CRI maps to a specific subset of the plurality of CSI-RSs, where $M_{tot}$ is an integer, and
wherein a bitwidth of the CRI is $[\log_2 M_{tot}]$.

12. The terminal as claimed in claim 11, wherein the CSI further comprises at least one of rank indicator (RI), a channel quality indicator (COI), a precoding matrix index (PMI) or a layer indicator (LI) corresponds to the CRI.

13. The terminal as claimed in claim 11, wherein the CSI-RSs indicated by the CRI are included in a CSI-RS resource set of the CSI configuration information.

14. The terminal as claimed in claim 11, wherein the value $M_{tot}$ is sum of a number of single CSI-RSs and a number of possible combinations of CSI-RSs among the plurality of CSI-RSs.

15. The terminal as claimed in claim 11, wherein the $M_{tot}$ is a number of subsets of the plurality of CSI-RSs.

16. A transmission and reception point (TRP) for receiving channel state information (CSI) in a wireless communication system, the TRP comprising:
a transceiver configured to transmit and receive a signal; and
a controller configured to:
transmit, to a terminal, CSI configuration information including information on a plurality of reference signals from a plurality of TRPs,
transmit at least one CSI reference signal (CSI-RS) to the terminal, and
receive the CSI generated based on a plurality of CSI-RSs, wherein the CSI comprises a CSI-RS resource indicator (CRI) indicating a subset of the plurality of CSI-RSs,
wherein a value of the CRI is one of integers from 0 to $M_{tot}$-1, and each value of CRI maps to a specific subset of the plurality of CSI-RSs, where $M_{tot}$ is an integer, and
wherein a bitwidth of the CRI is $[\log_2 M_{tot}]$.

17. The TRP as claimed in claim 16, wherein the CSI further comprises at least one of rank indicator (RI), a channel quality indicator (CQI), a precoding matrix index (PMI) or a layer indicator (LI) corresponds to the CRI.

18. The TRP as claimed in claim 16, wherein the CSI-RSs indicated by the CRI are included in a CSI-RS resource set of the CSI configuration information.

19. The TRP as claimed in claim 16, wherein the value $M_{tot}$ is sum of a number of single CSI-RSs and a number of possible combinations of CSI-RSs among the plurality of CSI-RSs.

20. The TRP as claimed in claim 16, wherein the $M_{tot}$ is a number of subsets of the plurality of CSI-RSs.

* * * * *